US012718489B2

(12) United States Patent
You et al.

(10) Patent No.: US 12,718,489 B2
(45) Date of Patent: Aug. 25, 2026

(54) WEARABLE DEVICE, METHOD AND COMPUTER READABLE STORAGE MEDIUM FOR DISPLAYING AVATAR

(71) Applicant: Samsung Electronics Co., Ltd., Suwon-si (KR)

(72) Inventors: Myunghan You, Suwon-si (KR); Hyungsok Yeo, Suwon-si (KR); Sungoh Kim, Suwon-si (KR); Jihyun Kim, Suwon-si (KR); Seunghyun Park, Suwon-si (KR); Donghyun Yeom, Suwon-si (KR); Sanghun Lee, Suwon-si (KR); Joohong Lee, Suwon-si (KR); Byungpo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 105 days.

(21) Appl. No.: 18/742,354

(22) Filed: Jun. 13, 2024

(65) Prior Publication Data

US 2025/0078411 A1 Mar. 6, 2025

Related U.S. Application Data

(63) Continuation of application No. PCT/KR2024/007305, filed on May 29, 2024.

(30) Foreign Application Priority Data

Aug. 28, 2023 (KR) ........................ 10-2023-0113205
Dec. 7, 2023 (KR) ........................ 10-2023-0177118

(51) Int. Cl.

| | |
|---|---|
| ***G06T 19/00*** | (2011.01) |
| ***G06F 3/01*** | (2006.01) |
| ***G06T 15/20*** | (2011.01) |

(52) U.S. Cl.
CPC .............. *G06T 19/00* (2013.01); *G06F 3/011* (2013.01); *G06F 3/012* (2013.01); *G06F 3/013* (2013.01);

(Continued)

(58) Field of Classification Search
CPC .......... G06F 3/011; G06F 3/012; G06F 3/013; G06T 15/20; G06T 19/00; G06T 2200/24; G06T 2219/024
See application file for complete search history.

(56) References Cited

U.S. PATENT DOCUMENTS 9,851,792 B2 12/2017 Shanware
10,504,296 B2 12/2019 Noguchi (Continued)

FOREIGN PATENT DOCUMENTS

JP 2019-522856 8/2019
KR 10-2020-0003024 1/2020

(Continued)

OTHER PUBLICATIONS

US 11,195,237 B2, 12/2021, Brody et al. (withdrawn)
Search Report and Written Opinion dated Sep. 30, 2024 issued in International Patent Application No. PCT/KR2024/007305.

*Primary Examiner* — Cory A Almeida
(74) *Attorney, Agent, or Firm* — Nixon & Vanderhye, P.C.

(57) ABSTRACT

According to an embodiment, at least one processor, comprising processing circuitry, of a wearable device may, individually and/or collectively, be configured to cause the wearable device to: receive information indicating place of an avatar of an other user entering the virtual space; in response to the receiving, check whether the place is located inside of a first part of the virtual space that is displayed through a display; and based on determining that the place is located outside of the first part, display an executable (Continued)

object configured to change a part of the virtual space displayed through the display to a second part of the virtual space including the place, through the display. The disclosure is generally related to a metaverse service for strengthening interconnectivity between a real object and a virtual object. For example, the metaverse service may be provided through a network based on fifth generation (5G) and/or sixth generation (6G).

20 Claims, 18 Drawing Sheets

(52) U.S. Cl.
CPC .......... *G06T 15/20* (2013.01); *G06T 2200/24* (2013.01); *G06T 2219/024* (2013.01)

(56) References Cited

U.S. PATENT DOCUMENTS

| | | | | |
|---|---|---|---|---|
| 10,657,701 | B2 | 5/2020 | Osman et al. | |
| 11,022,794 | B2 | 6/2021 | Sztuk et al. | |
| 11,276,215 | B1 | 3/2022 | Grossinger et al. | |
| 2016/0048989 | A1* | 2/2016 | Gabbidon | G06F 3/04842 715/716 |
| 2018/0005429 | A1* | 1/2018 | Osman | A63F 13/56 |
| 2018/0315133 | A1 | 11/2018 | Brody et al. | |
| 2022/0327640 | A1* | 10/2022 | Li | G06F 16/9535 |
| 2022/0382052 | A1 | 12/2022 | Muramoto | |
| 2022/0410006 | A1 | 12/2022 | Watanabe | |
| 2023/0334808 | A1* | 10/2023 | Sundstrom | G06F 3/04842 |
| 2025/0078429 | A1 | 3/2025 | Dascola et al. | |
| 2025/0306727 | A1 | 10/2025 | Kawashima et al. | |

FOREIGN PATENT DOCUMENTS

| | | |
|---|---|---|
| KR | 10-2021-0107784 | 9/2021 |
| KR | 10-2022-0160699 | 12/2022 |
| KR | 102528548 B1 | 5/2023 |
| KR | 10-2023-0122415 | 8/2023 |
| KR | 20230117639 | 8/2023 |
| KR | 102596341 | 11/2023 |
| WO | 2022/087147 | 4/2022 |

* cited by examiner

WEARABLE DEVICE, METHOD AND COMPUTER READABLE STORAGE MEDIUM FOR DISPLAYING AVATAR

CROSS-REFERENCE TO RELATED APPLICATIONS

This application is a continuation of International Application No. PCT/KR2024/007305 designating the United States, filed on May 29, 2024, in the Korean Intellectual Property Receiving Office and claiming priority to Korean Patent Application Nos. 10-2023-0113205, filed on Aug. 28, 2023, and 10-2023-0177118, filed on Dec. 7, 2023, in the Korean Intellectual Property Office, the disclosures of each of which are incorporated by reference herein in their entireties.

BACKGROUND

Field

The present disclosure relates to a wearable device, method, and computer readable storage medium for displaying an avatar.

Description of Related Art

In order to provide an enhanced user experience, an electronic device that provide an extended reality (XR) service that displays information generated by a computer in association with an external object in the real-world is being developed. The electronic device may provide the extended reality service to a user using a virtual object corresponding to the user.

The above-described information may be provided as a related art for the purpose of helping understand the present disclosure. No argument or decision is made as to whether any of the above-described content may be applied as a prior art associated with the present disclosure.

SUMMARY

The wearable device according to an example embodiment may comprise: at least one communication circuit, at least one display configured to align with eyes of a user wearing the wearable device, memory storing instructions, and at least one processor comprising processing circuitry. The instructions, when executed by at least one processor, individually and/or collectively, may cause the wearable device to: while providing a virtual space configured to change a view according to the movement of the wearable device in conjunction with a server in the wearable device, receive information indicating place of an avatar of an other user entering the virtual space from the server, using the at least one communication circuit. The instructions, when executed by at least one processor, individually and/or collectively, may cause the wearable device to, in response to the receiving, check whether the place is located inside of a first part of the virtual space displayed on the at least one display. The instructions, when executed by at least one processor, individually and/or collectively, may cause the wearable device to, based on determining that the place is located outside of the first part of the virtual space, display an executable object for changing a part of the virtual space displayed through the at least one display to a second part of the virtual space including the place, in an area on the first part of the virtual space indicating the place, through the at least one display. The instructions, when executed by at least one processor, individually and/or collectively, may cause the wearable device to, based on determining that the place is located inside of the first part of the virtual space, display the avatar in the first part of the virtual space, through the at least one display.

A method of a wearable device including at least one communication circuit, and at least one display configured to align with eyes of a user wearing the wearable device according to an example embodiment, may comprise: while providing a virtual space configured to change a view according to the movement of the wearable device in conjunction with a server in the wearable device, receiving information indicating place of an avatar of an other user entering the virtual space from the server, using the at least one communication circuit. The method may comprise, in response to the receiving, checking whether the place is located inside of a first part of the virtual space that is displayed on the at least one display. The method may comprise, based on determining that the place is located outside of the first part of the virtual space, displaying an executable object for changing a part of the virtual space displayed through the at least one display to a second part of the virtual space including the place, in an area on the first part of the virtual space indicating the place, through the at least one display. The method may comprise, based on determining that the place is located inside of the first part of the virtual space, displaying the avatar in the first part of the virtual space, through the at least one display.

A non-transitory computer-readable storage medium storing one or more programs according to an example embodiment, wherein the one or more programs, when executed by at least one processor, individually and/or collectively, of a wearable device including at least one communication circuit, and at least one display configured to align with eyes of a user wearing the wearable device, may cause the wearable device to: while providing a virtual space configured to change a view according to the movement of the wearable device in conjunction with a server in the wearable device, receive information indicating place of an avatar of other user entering the virtual space from the server, using the at least one communication circuit. The one or more programs, when executed by the wearable device, may cause the wearable device to, in response to the receiving, check whether the place is located inside of a first part of the virtual space that is displayed on the at least one display. The one or more programs, when executed by the wearable device, may cause the wearable device to, based on determining that the place is located outside of the first part of the virtual space, display an executable object for changing a part of the virtual space displayed through the at least one display to a second part of the virtual space including the place, in an area on the first part of the virtual space indicating the place, through the at least one display. The one or more programs, when executed by the wearable device, may cause the wearable device to, based on determining that the place is located inside of the first part of the virtual space, display the avatar in the first part of the virtual space, through the at least one display.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
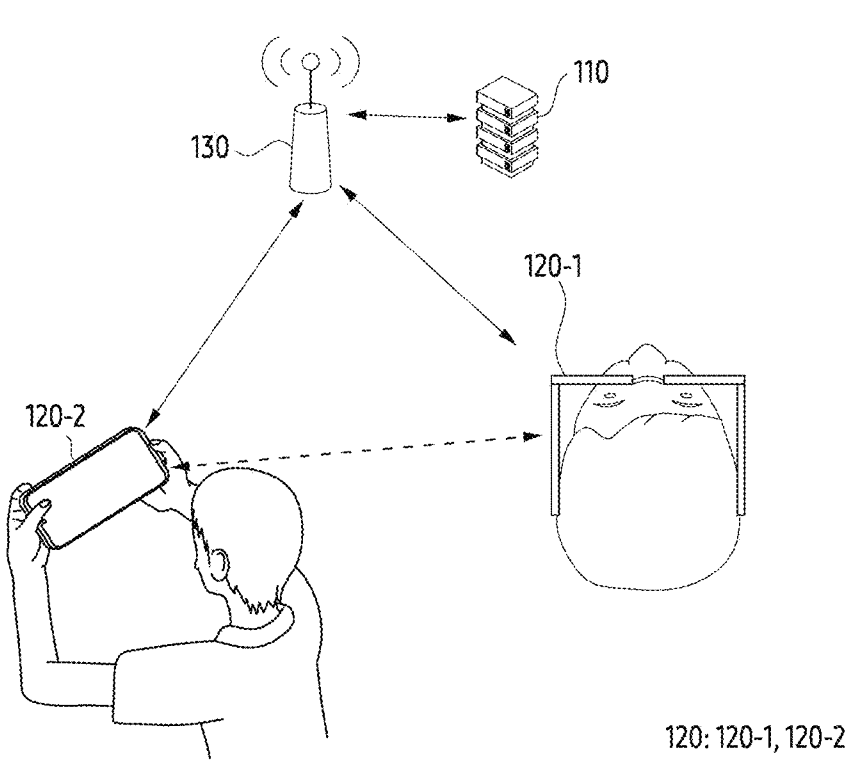
FIG. 1 is a diagram illustrating an example network environment receiving a metaverse service through a server according to various embodiments.

An electronic device according to various embodiments may be various types of devices. The electronic device may include, for example, a portable communication device (e.g., a smartphone), a computer device, a portable multimedia device, a portable medical device, a camera, an electronic device, a home appliance, or the like. The electronic device according to an embodiment of the present disclosure is not limited to the above-described devices.

The various embodiments of the present disclosure and terms used herein are not intended to limit the technical features described in the present disclosure to specific embodiments, and should be understood to include various modifications, equivalents, or substitutes of the various embodiments. In relation to the description of the drawings, a similar reference numeral may be used for a similar or related component. The singular form of the noun corresponding to the item may include one or a plurality of items unless explicitly indicated differently in the context involved. In the present disclosure, each of the phrases such as “A or B”, “at least one of A and B”, “at least one of A or B”, “A, B or C”, “at least one of A, B and C”, and “at least one of A, B or C” may include any one among the items listed together with the corresponding phrase among the phrases, or all possible combinations thereof. Terms such as “1st”, “2nd”, or “the first”, or “the second” may be used simply to distinguish a corresponding component from another corresponding component, and do not limit the corresponding component to other aspects (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), the element may be coupled with the other element directly (e.g., wiredly), wirelessly, or via a third element.

The term “module” used in various embodiments of the present disclosure may include units implemented in hardware, software, or firmware, or any combination thereof, and may be used interchangeably with terms such as logic, logic block, component, or circuit, for example. The module may be an integrally configured component or a minimum unit of the component or a part thereof that performs one or more functions. For example, according to an embodiment, the module may be implemented in the form of an application-specific integrated circuit (ASIC).

Various embodiments of the present disclosure may be implemented as a software (e.g., a program) including one or more instructions stored in a storage medium (e.g., internal memory or external memory) that may be read by a machine (e.g., a wearable device 101). For example, a processor (e.g., a processor 410, see FIG. 4) of the machine (e.g., the wearable device 101, sec, e.g., FIGS. 2A, 2B, 3A and 3B) may call at least one instruction among one or more instructions stored from the storage medium and execute it. This makes it possible for the machine to be operated to perform at least one function according to the at least one called instruction. The one or more instructions may include code generated by a compiler or code that may be executed by an interpreter. The machine-readable storage medium may be provided in the form of a non-transitory storage medium. The, ‘non-transitory’ storage medium is a tangible device and may not include a signal (e.g., electromagnetic waves), and this term does not distinguish between a case where data is semi-permanently stored in the storage medium and a case where data is temporarily stored.

According to an embodiment, a method according to various embodiments disclosed in the present disclosure may be included in a computer program product and provided. The computer program product may be traded between a seller and a buyer as a product. The computer program product may be distributed in the form of machine-readable storage medium (e.g., compact disc read only memory (CD-ROM)), or may be distributed (e.g., downloaded or uploaded) online, through an application store (e.g., Play Store™) or directly between two user devices (e.g., smartphones). In case of the online distribution, at least a portion of the computer program product may be at least temporarily stored or temporarily generated in the machine-readable storage medium, such as the memory of a manufacturer’s server, an application store’s server, or a relay server.

According to various embodiments, each component (e.g., module or program) of the above-described components may include a single or plural entity, and some of the plurality of entities may be separately disposed in other components. According to various embodiments, one or more components among the above-described corresponding components or operations may be omitted, or one or more other components or operations may be added. Alternatively or additionally, a plurality of components (e.g., module or program) may be integrated into one component. In this case, the integrated component may perform one or more functions of each component of the plurality of components identically or similarly to those performed by the corresponding component among the plurality of components prior to the integration. According to various embodiments, operations performed by the module, the program, or another component may be carried out sequentially, in parallel, repeatedly, or heuristically, or one or more of the operations may be executed in a different order or omitted, or one or more other operations may be added.

Metaverse is a combination of the English words 'Meta', which refers to 'virtual' and 'transcendence', and 'Universe', which refers to space, and refers to a 3 dimensional virtual world in which social, economic, and cultural activities such as the real world take place. The metaverse is a more advanced concept than virtual reality (VR, state-of-the-art technology that allows people to experience real life in a virtual world created by computers), and it is characterized using avatars to not only enjoy games or virtual reality, but also engage in social and cultural activities such as real reality. Based on augmented reality (AR), virtual reality environment (VR), mixed environment (MR), and/or extended reality (XR), the metaverse service may provide media content to enhance immersion in the virtual world.

For example, media content provided by the metaverse service may include social interaction content that includes an avatar-based game, concert, party, and/or meeting. For example, the media content may include information for an economic activity such as advertising, user created content, and/or the sale and/or shopping of productions. Ownership of the user created content may be proved by a blockchain-based non-fungible token (NFT). The metaverse service may support an economic activity based on real money and/or cryptocurrency. By the metaverse service, virtual content linked to the real world, such as digital twin or life logging, may be provided.

FIG. 1 is a diagram illustrating an example network environment 150 receiving a metaverse service through a server 110 according to various embodiments.

Referring to FIG. 1, the network environment 150 may include a server 110, a user terminal 120 (e.g., a first terminal 120-1 and a second terminal 120-2), and a network connecting the server 110 and the user terminal 120. In the network environment 150, the server 110 may provide the metaverse service to the user terminal 120. The network may be formed by at least one intermediate node 130 including an access point (AP) and/or a base station. The user terminal 120 may output a user interface (UI) related to the metaverse service to the user of the user terminal 120, by accessing the server 110 through the network. Based on the UI, the user terminal 120 may obtain information to be inputted into the metaverse service from the user, or may output information (e.g., multimedia content) related to the metaverse service to the user.

In this case, the server 110 provides a virtual space so that the user terminal 120 may perform an activity in the virtual space. In addition, the user terminal 120 expresses information provided by the server 110 to the user or transmits information that the user wants to express in the virtual space to the server, by installing an S/W agent for accessing the virtual space provided by the server 110. The S/W agent may be provided directly through the server 110, downloaded from a public server, or provided by being embedded when purchasing the terminal.

In an embodiment, the metaverse service may be provided to the user terminal 120 and/or the user using the server 110. The disclosure is not limited thereto, and the metaverse service may be provided through individual contact between users. For example, in the network environment 150, the metaverse service may be provided by a direct connection between the first terminal 120-1 and the second terminal 120-2 independently of the server 110. Referring to FIG. 1, in the network environment 150, the first terminal 120-1 and the second terminal 120-2 may be connected to each other through a network formed by at least one intermediate node 130. In an embodiment in which the first terminal 120-1 and the second terminal 120-2 are directly connected, any one user terminal among the first terminal 120-1 and the second terminal 120-2 may perform a role of the server 110. For example, a metaverse environment may be configured only by a device-to-device connection (e.g., a peer-to-peer (P2P) connection).

In an embodiment, the user terminal 120 (or the user terminal 120 including the first terminal 120-1 and the second terminal 120-2) may include various form factors, and may be characterized in that it includes an output device providing an image or/and sound to the user and an input device for inputting information into the metaverse service. For example, various form factors of the user terminal 120 may include a smartphone (e.g., the second terminal 120-2), an AR device (e.g., the first terminal 120-1), a VR device, an MR device, a Video Sec Through (VST) device, an Optical See Through (OST) device, a smart lens, a smart mirror, a TV or projector capable of input and output.

The network (e.g., a network formed by at least one intermediate node 130) of the present disclosure includes all of various broadband networks including 3G, 4G, and 5G, and a short-range network (e.g., a wired network or wireless network directly connecting the first terminal 120-1 and the second terminal 120-2) including WiFi, BT, and the like.

Figure 2A:
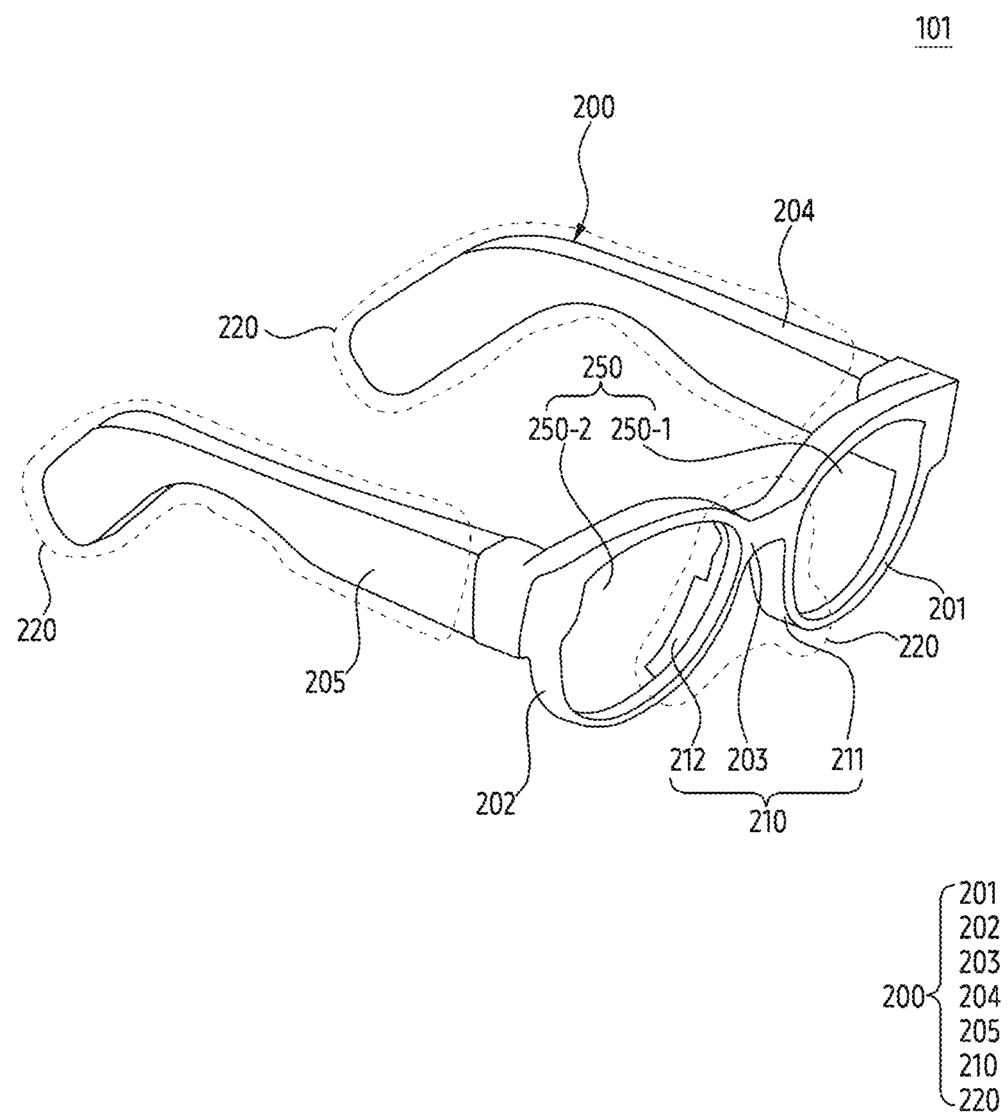
FIG. 2A is a perspective view illustrating an example wearable device according to various embodiments.
Figure 2B:
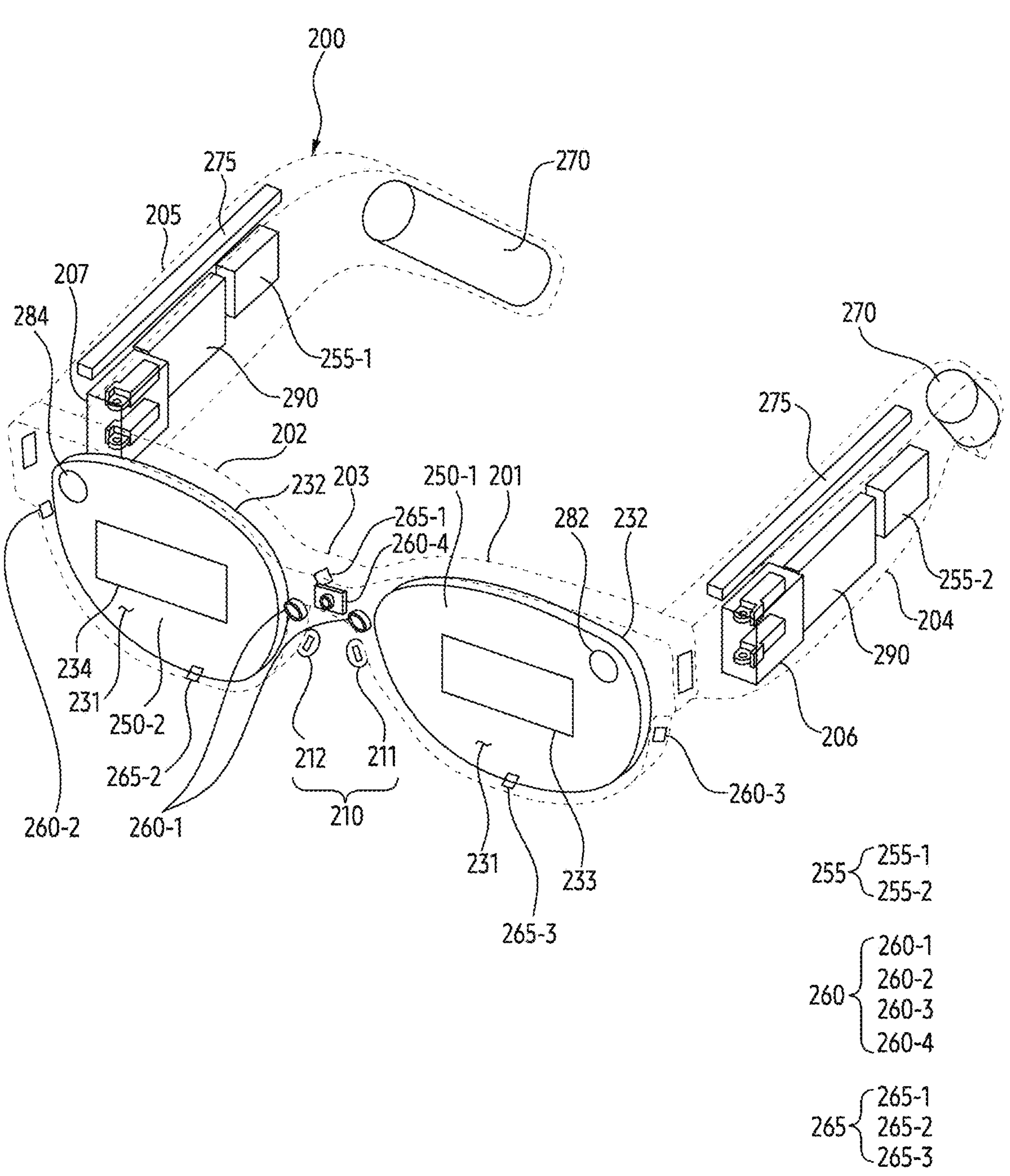
FIG. 2B is a perspective view illustrating an example configuration, including one or more hardware components, disposed in a wearable device, according to various embodiments.

FIG. 2A is a perspective view illustrating an example wearable device according to various embodiments. FIG. 2B is a perspective view illustrating an example configuration, including various hardware components, of an example wearable device according to various embodiments. According to an embodiment, a wearable device 101 may have a form of glasses that are wearable on a user's body part (e.g., head). The wearable device 101 of FIGS. 2A to 2B may be an example of a user terminal 120 of FIG. 1. The wearable device 101 may include a head-mounted display (HMD). For example, a housing of the wearable device 101 may include a flexible material such as rubber and/or silicon having a form that closely adheres to a portion of the user's head (e.g., a portion of the face surrounding both eyes). For example, the housing of the wearable device 101 may include one or more straps that are able to be twined around the user's head and/or one or more temples that are attachable to the cars of the head.

Referring to FIG. 2A, according to an embodiment, the wearable device 101 may include at least one display 250 and a frame 200 supporting the at least one display 250.

According to an embodiment, the wearable device 101 may be worn on a portion of the user's body. The wearable device 101 may provide augmented reality (AR), virtual reality (VR), or mixed reality (MR) in which augmented reality and virtual reality are mixed, to the user wearing the wearable device 101. For example, the wearable device 101 may display a virtual reality image provided from at least one optical device 282 and 284 of FIG. 2B on the at least one display 250, in response to a user's designated gesture obtained through a motion recognition camera (or motion tracking camera) 260-2 and 260-3 of FIG. 2B.

According to an embodiment, the at least one display 250 may provide visual information to the user. For example, the at least one display 250 may include a transparent or translucent lens. The at least one display 250 may include a first display 250-1 and/or a second display 250-2 spaced apart from the first display 250-1. For example, the first display 250-1 and the second display 250-2 may be disposed at positions corresponding to the user's left eye and right eye, respectively.

Referring to FIG. 2B, the at least one display 250 may provide visual information transmitted from ambient light and other visual information distinct from the visual information to the user through the lens included in the at least one display 250. The lens may be formed based on at least one of a fresnel lens, a pancake lens, or a multi-channel lens. For example, the at least one display 250 may include a first surface 231 and a second surface 232 opposite to the first surface 231. A display area may be formed on the second surface 232 of the at least one display 250. When the user wears the wearable device 101, the ambient light may be transmitted to the user by being incident on the first surface 231 and penetrated through the second surface 232. For another example, the at least one display 250 may display an augmented reality image in which the virtual reality image provided from the at least one optical device 282 and 284 is combined with a reality screen transmitted through the ambient light, on the display area formed on the second surface 232.

In an embodiment, the at least one display 250 may include at least one waveguide 233 and 234 that diffracts light transmitted from the at least one optical device 282 and 284 and transmits the diffracted light to the user. The at least one waveguide 233 and 234 may be formed based on at least one of glass, plastic, or polymer. A nano pattern may be formed on at least a portion of the outside or inside of the at least one waveguide 233 and 234. The nano pattern may be formed based on a grating structure having a shape of a polygon and/or a curved surface. Light incident to one end of the at least one waveguide 233 and 234 may be propagated to the other end of the at least one waveguide 233 and 234 by the nano pattern. The at least one waveguide 233 and 234 may include at least one of at least one diffractive element (e.g., a diffractive optical element (DOE), a holographic optical element (HOE)) or a reflective element (e.g., a reflective mirror). For example, the at least one waveguide 233 and 234 may be disposed in the wearable device 101 to guide a screen displayed by the at least one display 250 to the user's eyes. For example, the screen may be transmitted to the user's eyes based on total internal reflection (TIR) generated in the at least one waveguide 233 and 234.

The wearable device 101 may analyze an object included in a reality image collected through a photographing camera 260-4, combine a virtual object corresponding to an object that becomes a subject of augmented reality provision among the analyzed objects, and display it on the at least one display 250. The virtual object may include at least one of text and an image for various information associated with the object included in the reality image. The wearable device 101 may analyze the object based on a multi-camera such as a stereo camera. For the object analysis, the wearable device 101 may execute space recognition (e.g., simultaneous localization and mapping (SLAM) using the multi-camera and/or time-of-flight (ToF). The user wearing the wearable device 101 may watch the image displayed on the at least one display 250.

According to an embodiment, the frame 200 may be configured with a physical structure in which the wearable device 101 may be worn on the user's body. According to an embodiment, the frame 200 may be configured such that when the user wears the wearable device 101, the first display 250-1 and the second display 250-2 may be located at positions corresponding to the user's left eye and right eye. The frame 200 may support the at least one display 250. For example, the frame 200 may support the first display 250-1 and the second display 250-2 to be located at positions corresponding to the user's left eye and right eye.

Referring to FIG. 2A, the frame 200 may include an area 220 at least a portion of which is in contact with the portion of the user's body, in case that the user wears the wearable device 101. For example, the area 220 in contact with the portion of the user's body of the frame 200 may include an area in contact with a portion of a user's nose, a portion of a user's car, and a portion of a side surface of a user's face, that the wearable device 101 contacts. According to an embodiment, the frame 200 may include a nose pad 210 that is contacted on the portion of the user's body. When the wearable device 101 is worn by the user, the nose pad 210 may be contacted on the portion of the user's nose. The frame 200 may include a first temple 204 and a second temple 205 that is contacted on another portion of the user's body that is distinct from the portion of the user's body.

For example, the frame 200 may include a first rim 201 surrounding at least a portion of the first display 250-1, a second rim 202 surrounding at least a portion of the second display 250-2, a bridge 203 disposed between the first rim 201 and the second rim 202, a first pad 211 disposed along a portion of the edge of the first rim 201 from one end of the bridge 203, a second pad 212 disposed along a portion of the edge of the second rim 202 from the other end of the bridge 203, the first temple 204 extending from the first rim 201 and fixed to a portion of the wearer's car, and the second temple 205 extending from the second rim 202 and fixed to a portion of the car opposite to the car. The first pad 211 and the second pad 212 may be in contact with the portion of the user's nose, and the first temple 204 and the second temple 205 may be in contact with a portion of the user's face and the portion of the user's car. The temples 204 and 205 may be rotatably connected to the rim through hinge units 206 and 207 of FIG. 2B. The first temple 204 may be rotatably connected with respect to the first rim 201 through the first hinge unit 206 disposed between the first rim 201 and the first temple 204. The second temple 205 may be rotatably connected with respect to the second rim 202 through the second hinge unit 207 disposed between the second rim 202 and the second temple 205. According to an embodiment, the wearable device 101 may identify an external object (e.g., a user's fingertip) touching the frame 200 and/or a gesture performed by the external object using a touch sensor, a grip sensor, and/or a proximity sensor formed on at least a portion of a surface of the frame 200.

According to an embodiment, the wearable device 101 may include hardware (e.g., hardware to be described in greater detail below based on the block diagram of FIG. 4) that performs various functions. For example, the hardware may include a battery module (e.g., including at least one battery) 270, an antenna module (e.g., including at least one antenna) 275, the at least one optical device 282 and 284, speakers (e.g., speakers 255-1 and 255-2), a microphone (e.g., microphones 265-1, 265-2, and 265-3), a light emitting module (not illustrated), and/or a printed circuit board (PCB) 290 (e.g., a printed circuit board). Various hardware may be disposed in the frame 200.

According to an embodiment, the microphone (e.g., the microphones 265-1, 265-2, and 265-3) of the wearable device 101 may obtain a sound signal, by being disposed on at least a portion of the frame 200. The first microphone 265-1 disposed on the bridge 203, the second microphone 265-2 disposed on the second rim 202, and the third microphone 265-3 disposed on the first rim 201 are illustrated in FIG. 2B, but the number and disposition of the microphones 265 are not limited to an embodiment of FIG. 2B. In case that the number of microphones 265 included in the wearable device 101 is two or more, the wearable device 101 may identify the direction of the sound signal using a plurality of microphones disposed on different portions of the frame 200.

According to an embodiment, the at least one optical device 282 and 284 may project the virtual object to the at least one display 250, in order to provide various image information to the user. For example, the at least one optical device 282 and 284 may be a projector. The at least one optical device 282 and 284 may be disposed adjacent to the at least one display 250 or may be included in the at least one display 250 as a portion of the at least one display 250. According to an embodiment, the wearable device 101 may include a first optical device 282 corresponding to the first display 250-1 and a second optical device 284 corresponding to the second display 250-2. For example, the at least one optical device 282 and 284 may include the first optical device 282 disposed at an edge of the first display 250-1 and the second optical device 284 disposed at an edge of the second display 250-2. The first optical device 282 may transmit light to the first waveguide 233 disposed on the first display 250-1, and the second optical device 284 may transmit light to the second waveguide 234 disposed on the second display 250-2.

In an embodiment, a camera 260 may include the photographing camera 260-4, an eye tracking camera (ET CAM) 260-1, and/or the motion recognition camera 260-2 and 260-3. The photographing camera 260-4, the eye tracking camera (ET CAM) 260-1, and the motion recognition camera 260-2 and 260-3 may be disposed at different positions on the frame 200 and may perform different functions. The eye tracking camera (ET CAM) 260-1 (e.g., an eye tracking camera 225-1 of FIG. 2) may output data indicating an eye position or the gaze of the user wearing the wearable device 101. For example, the wearable device 101 may detect the gaze from an image including a user's pupil obtained through the eye tracking camera (ET CAM) 260-1. The wearable device 101 may identify an object (e.g., a real object, and/or a virtual object) focused by the user using the user's gaze obtained through the eye tracking camera (ET CAM) 260-1. The wearable device 101 that identified the focused object may execute a function (e.g., gaze interaction) for interaction between the user and the focused object. The wearable device 101 may represent a portion corresponding to the eye of the avatar indicating the user in the virtual space using the user's gaze obtained through the eye tracking camera (ET CAM) 260-1. The wearable device 101 may render an image (or screen) displayed on the at least one display 250 based on the position of the user's eye. For example, visual quality of a first area related to the gaze in the image and visual quality (e.g., resolution, brightness, saturation, grayscale, or pixels per inch (PPI)) of a second area distinct from the first area may be different from each other. The wearable device 101 may obtain an image (or screen) having the visual quality of the first area and the visual quality of the second area matching the user's gaze using foveated rendering. For example, in case that the wearable device 101 supports an iris recognition function, user authentication may be performed based on iris information obtained using the eye tracking camera (ET CAM) 260-1. An example in which the eye tracking camera (ET CAM) 260-1 is disposed toward both eyes of the user is illustrated in FIG. 2B, but the disclosure is not limited thereto, and the eye tracking camera (ET CAM) 860-1 may be disposed alone toward the user's left eye or right eye.

In an embodiment, the photographing camera 260-4 may photograph a real image or background to be matched with a virtual image in order to implement the augmented reality or mixed reality content. The photographing camera 260-4 may be used to obtain an image having a high resolution based on a high resolution (HR) or a photo video (PV). The photographing camera 260-4 may photograph an image of a specific object existing at a position viewed by the user and may provide the image to the at least one display 250. The at least one display 250 may display one image in which a virtual image provided through the at least one optical device 282 and 284 is overlapped with information on the real image or background including an image of the specific object obtained using the photographing camera 260-4. The wearable device 101 may compensate for depth information (e.g., a distance between the wearable device 101 and an external object obtained through a depth sensor) using an image obtained through the photographing camera 260-4. The wearable device 101 may perform object recognition through the image obtained using the photographing camera 260-4. The wearable device 101 may perform a function (e.g., auto focus) of focusing on an object (or subject) in the image using the photographing camera 260-4 and/or an optical image stabilization (OIS) function (e.g., an anti-shaking function). The wearable device 101 may perform a pass-through function for displaying an image obtained through the photographing camera 260-4 overlapping at least a portion of the screen, while displaying a screen indicating the virtual space on the at least one display 250. The photographing camera 260-4 may be referred to as a high resolution (HR) camera or a photo video (PV) camera. The photographing camera 260-4 may provide an auto focus (AF) function and an optical image stabilization (OIS) function. The photographing camera 260-4 may include a global shutter (GS) camera and/or a rolling shutter (RS) camera. In an embodiment, the photographing camera 260-4 may be disposed on the bridge 203 disposed between a first rim 201 and a second rim 202.

The eye tracking camera (ET CAM) 260-1 may implement a more realistic augmented reality by matching the user's gaze with the visual information provided on the at least one display 250 by tracking the gaze of the user wearing the wearable device 101. For example, when the user looks at the front, the wearable device 101 may naturally display environment information associated with the user's front on the at least one display 250 at a place where the user is located. The eye tracking camera (ET CAM) 260-1 may be configured to capture an image of the user's pupil in order to determine the user's gaze. For example, the eye tracking camera (ET CAM) 260-1 may receive gaze detection light reflected from the user's pupil and may track the user's gaze based on the position and movement of the received gaze detection light. In an embodiment, the eye tracking camera (ET CAM) 260-1 may be disposed at a position corresponding to the user's left and right eyes. For example, the eye tracking camera (ET CAM)

260-1 may be disposed in the first rim 201 and/or the second rim 202 to face the direction in which the user wearing the wearable device 101 is located.

The motion recognition camera 260-2 and 260-3 may provide a specific event to the screen provided on the at least one display 250 by recognizing the movement of the whole or portion of the user's body, such as the user's torso, hand, or face and the like. The motion recognition camera 260-2 and 260-3 may obtain a signal corresponding to the gesture by recognizing the user's gesture (e.g., gesture recognition), and may provide a display corresponding to the signal to the at least one display 250. The processor may identify a signal corresponding to the gesture and may perform a designated function based on the identification. The motion recognition camera 260-2 and 260-3 may be used to perform a space recognition function using SLAM and/or a depth map for 6 degrees of freedom pose (6 dof pose). The processor may perform a gesture recognition function and/or an object tracking function using the motion recognition camera 260-2 and 260-3. In an embodiment, the motion recognition camera 260-2 and 260-3 may be disposed on the first rim 201 and/or the second rim 202. The motion recognition camera 260-2 and 260-3 may include a global shutter (GS) camera (e.g., a global shutter (GS) camera) used for head tracking, hand tracking, and/or space recognition based on one of a 3 degrees of freedom pose or the 6 degrees of freedom pose. The GS camera may include two or more stereo cameras to track a fine movement. For example, the GS camera may be included in the eye tracking camera (ET CAM) 260-1 for tracking the user's gaze.

The camera 260 included in the wearable device 101 is not limited to the above-described eye tracking camera (ET CAM) 260-1 and the motion recognition camera 260-2 and 260-3. For example, the wearable device 101 may identify an external object included in the field of view (FoV) using the camera disposed toward the user's FoV. That the wearable device 101 identifies the external object may be performed based on a sensor for identifying a distance between the wearable device 101 and the external object, such as a depth sensor and/or a time of flight (ToF) sensor. The camera 260 disposed toward the FoV may support an autofocus function and/or an optical image stabilization (OIS) function. For example, the wearable device 101 may include the camera 260 (e.g., a face tracking (FT) camera) disposed toward the face in order to obtain an image including the face of the user wearing the wearable device 101.

Although not illustrated, according to an embodiment, the wearable device 101 may further include a light source (e.g., LED) that emits light toward a subject (e.g., the user's eyes, face, and/or the external object in the FoV) photographed using the camera 260. The light source may include an LED having an infrared wavelength. The light source may be disposed on at least one of the frame 200, and the hinge units 206 and 207.

According to an embodiment, the battery module 270 may include at least one battery and supply power to electronic components of the wearable device 101. In an embodiment, the battery module 270 may be disposed in the first temple 204 and/or the second temple 205. For example, the battery module 270 may be a plurality of battery modules 270. The plurality of battery modules 270, respectively, may be disposed on each of the first temple 204 and the second temple 205. In an embodiment, the battery module 270 may be disposed at an end of the first temple 204 and/or the second temple 205.

The antenna module 275 may include an antenna and transmit the signal or power to the outside of the wearable device 101 or may receive the signal or power from the outside. In an embodiment, the antenna module 275 may be disposed in the first temple 204 and/or the second temple 205. For example, the antenna module 275 may be disposed close to one surface of the first temple 204 and/or the second temple 205.

The speaker 255 may output a sound signal to the outside of the wearable device 101. A sound output module may be referred to as a speaker. In an embodiment, the speaker 255 may be disposed in the first temple 204 and/or the second temple 205 in order to be disposed adjacent to the car of the user wearing the wearable device 101. For example, the speaker 255 may include the second speaker 255-2 disposed adjacent to the user's left ear by being disposed in the first temple 204, and the first speaker 255-1 disposed adjacent to the user's right car by being disposed in the second temple 205.

The light emitting module (not illustrated) may include at least one light emitting element. The light emitting module may emit light of a color corresponding to a specific state or may emit light by an operation corresponding to the specific state in order to visually provide information on a specific state of the wearable device 101 to the user. For example, in case that the wearable device 101 needs charging, it may emit light which is red light at regular intervals. In an embodiment, the light emitting module may be disposed on the first rim 201 and/or the second rim 202.

Referring to FIG. 2B, according to an embodiment, the wearable device 101 may include the printed circuit board (PCB) 290. The PCB 290 may be included in at least one of the first temple 204 or the second temple 205. The PCB 290 may include an interposer disposed between at least two sub PCBs. On the PCB 290, one or more hardware (e.g., hardware illustrated by different blocks of FIG. 4) included in the wearable device 101 may be disposed. The wearable device 101 may include a flexible PCB (FPCB) for interconnecting the hardware.

According to an embodiment, the wearable device 101 may include at least one of a gyro sensor, a gravity sensor, and/or an acceleration sensor for detecting a posture of the wearable device 101 and/or the posture of a body part (e.g., a head) of the user wearing the wearable device 101. Each of the gravity sensor and the acceleration sensor may measure gravity acceleration, and/or acceleration based on designated 3 dimensional axes (e.g., x-axis, y-axis, and z-axis) perpendicular to each other. The gyro sensor may measure angular velocity of each of designated 3 dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 101 may identify the user's motion and/or gesture performed to execute or cease a specific function of the wearable device 101 based on the IMU.

Figure 3A:
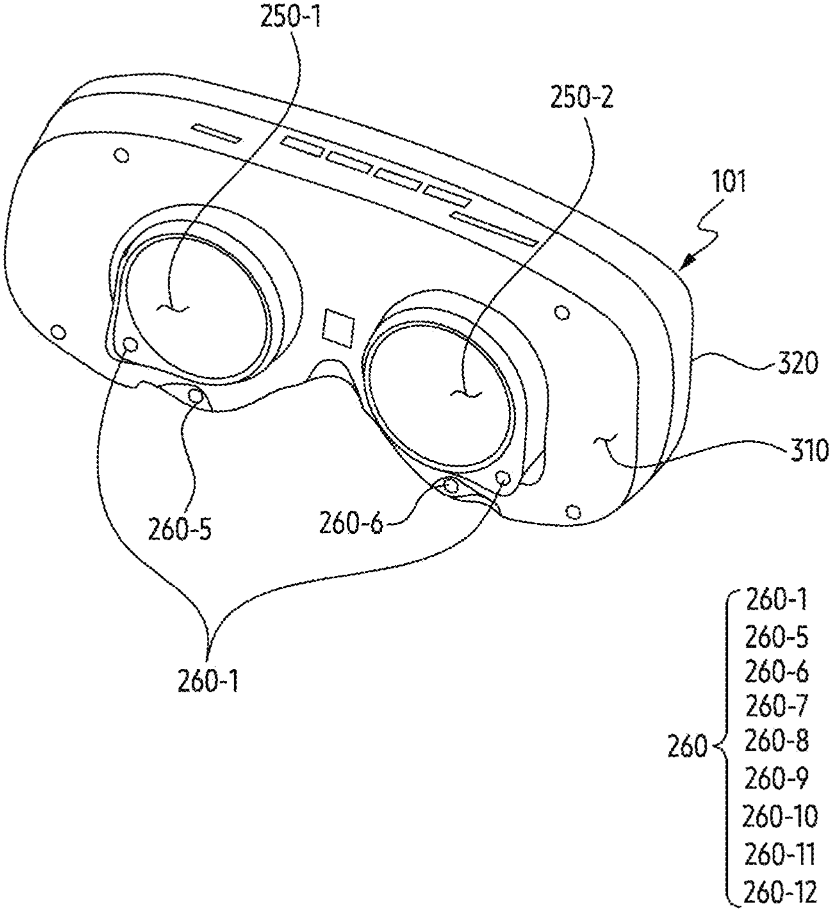
FIGS. 3A and 3B are front and rear perspective views illustrating an example of exterior of a wearable device according to various embodiments.
Figure 3B:
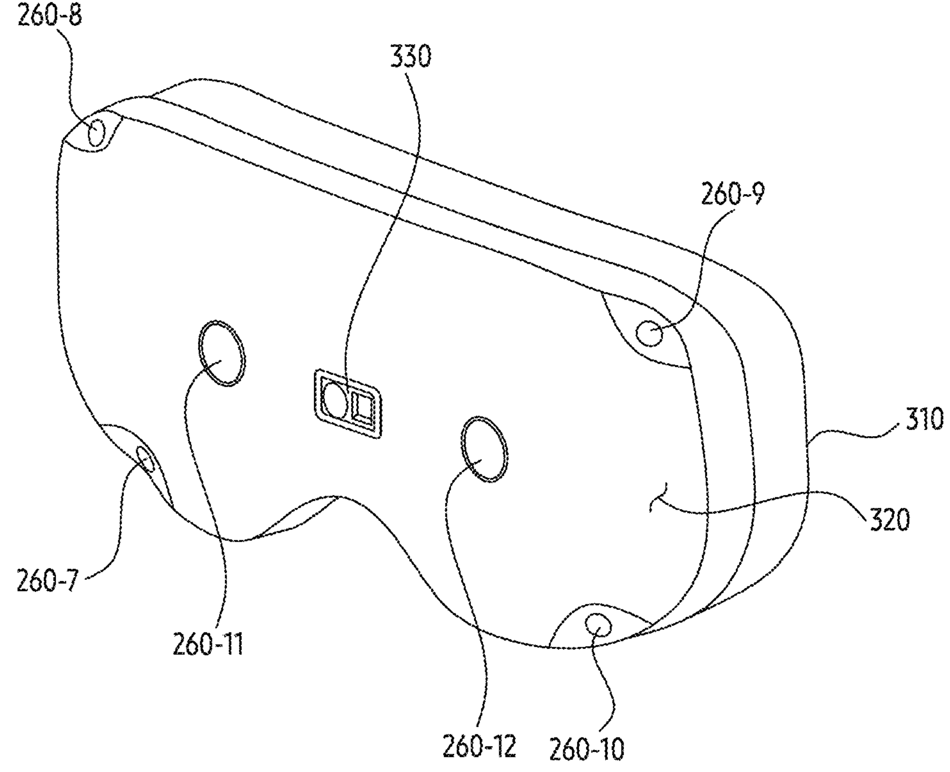

FIGS. 3A and 3B are front and rear perspective views illustrating an example wearable device according to various embodiments. A wearable device 101 of FIGS. 3A and 3B may be an example of the wearable device 101 of FIG. 1. According to an embodiment, an example of exterior of a first surface 310 of a housing of the wearable device 101 may be illustrated in FIG. 3A, and an example of exterior of a second surface 320 opposite to the first surface 310 may be illustrated in FIG. 3B.

Referring to FIG. 3A, according to an embodiment, the first surface 310 of the wearable device 101 may have an attachable form on a user's body part (e.g., the user's face). Although not illustrated, the wearable device 101 may further include a strap for fixing on the user's body part and/or one or more temples (e.g., a first temple 204 and/or a second temple 205 of FIGS. 2A to 2B). A first display 250-1 for outputting an image to a left eye among both eyes of the user and a second display 250-2 for outputting an image to a right eye among both eyes may be disposed on the first surface 310. The wearable device 101 may further include rubber or silicon packing, which are formed on the first surface 310, to prevent and/or reduce interference by light (e.g., ambient light) different from the light emitted from the first display 250-1 and the second display 250-2.

According to an embodiment, the wearable device 101 may include cameras 260-1 for photographing and/or tracking both eyes of the user adjacent to each of the first display 250-1 and the second display 250-2. The cameras 260-1 may be referred to an eye tracking camera 260-1 of FIG. 2B. According to an embodiment, the wearable device 101 may include cameras 260-5 and 260-6 for photographing and/or recognizing the user's face. The cameras 260-5 and 260-6 may be referred to as FT cameras. The wearable device 101 may control an avatar representing the user in the virtual space based on a motion of the user's face identified using the cameras 260-5 and 260-6. For example, the wearable device 101 may change a texture and/or shape of a portion of the avatar (e.g., a portion of an avatar representing a person's face), using information obtained by cameras 260-5 and 260-6 (e.g., FT camera) and representing facial expression of a user wearing the wearable device 101.

Referring to FIG. 3B, a camera (e.g., cameras 260-7, 260-8, 260-9, 260-10, 260-11, and 260-12)) for obtaining information related to an external environment of the wearable device 101, and/or a sensor (e.g., a depth sensor 330) may be disposed on the second surface 320 opposite to the first surface 310 of FIG. 3A. For example, the cameras 260-7, 260-8, 260-9, and 260-10 may be disposed on the second surface 320 to recognize an external object. The cameras 260-7, 260-8, 260-9, and 260-10 may be referred to the motion recognition camera 260-2 and 260-3 of FIG. 2B.

For example, using cameras 260-11 and 260-12, the wearable device 101 may obtain an image and/or video to be transmitted to each of both eyes of the user. The camera 260-11 may be disposed on the second surface 320 of the wearable device 101 to obtain an image to be displayed through the second display 250-2 corresponding to the right eye among both eyes. The camera 260-12 may be disposed on the second surface 320 of the wearable device 101 to obtain an image to be displayed through the first display 250-1 corresponding to the left eye among both eyes. For example, the wearable device 101 may obtain one screen using a plurality of images obtained through the cameras 260-11 and 260-12. The cameras 260-11 and 260-12 may be referred to the photographing camera 260-4 of FIG. 2B.

According to an embodiment, the wearable device 101 may include the depth sensor 330 disposed on the second surface 320 to identify the distance between the wearable device 101 and the external object. Using the depth sensor 330, the wearable device 101 may obtain spatial information (e.g., a depth map) for at least a portion of the FoV of the user wearing the wearable device 101. Although not illustrated, a microphone for obtaining sound outputted from the external object may be disposed on the second surface 320 of the wearable device 101. The number of microphones may be one or more according to various embodiments.

Hereinafter, with reference to FIG. 4, a description of example hardware and/or software used by the wearable device 101 according to an embodiment to obtain information on an avatar corresponding to another user different from the user of the wearable device will be described in greater detail.

Figure 4:
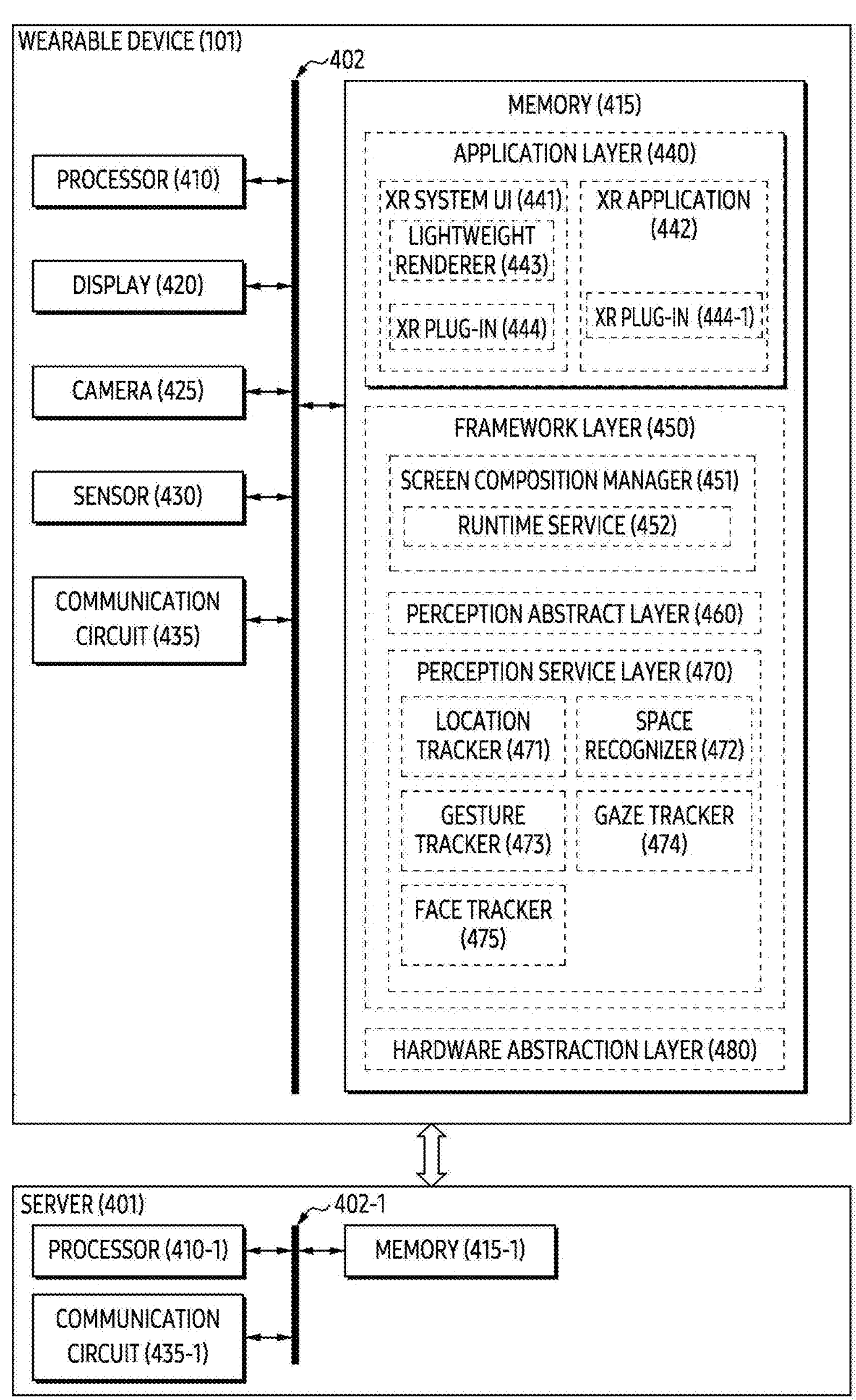
FIG. 4 is a block diagram illustrating an example configuration of a wearable device according to various embodiments.

FIG. 4 is a block diagram illustrating an example configuration of a wearable device according to various embodiments. A wearable device 101 of FIG. 4 may include a user terminal 120 of FIG. 1 and the wearable device 101 of FIGS. 2A to 3B. In an embodiment, in terms of being owned by a user, the wearable device 101 may be referred to as a terminal (or a user terminal). The terminal may include, for example, a personal computer (PC) such as a laptop and a desktop. The terminal may include, for example, a smartphone, a smartpad, and/or a tablet PC. The terminal may include a smart accessory such as a smartwatch and/or a head-mounted device (HMD).

The wearable device 101 according to an embodiment may include a head-mounted display (HMD) that is wearable on the user's head. The wearable devices 101 may be one or more (or the plural). The wearable device 101 according to an embodiment may include a camera disposed facing the front of the user, in a state worn by the user. The front of the user may include a direction in which the user's head and/or the user's gaze are facing. The wearable device 101 according to an embodiment may include a sensor for identifying the user's head and/or a motion of the wearable device 101, in the state worn by the user. The wearable device 101 may identify a posture of the wearable device 101 based on data of the sensor. In order to provide a user interface (UI) based on virtual reality (VR), augmented reality (AR), and/or mixed reality (MR) to the user wearing the wearable device 101, the wearable device 101 may control the camera and/or the sensor. The UI may be related to a metaverse service provided by a server connected to the wearable device 101, and/or the wearable device 101, and/or a notification service.

According to an embodiment, the wearable device 101 may execute functions related to the augmented reality (AR) and/or the mixed reality (MR). In a state in which the user wears the wearable device 101, the wearable device 101 may include at least one lens disposed adjacent to the user's eyes. Ambient light passing through the lens of the wearable device 101 may be combined (or mixed) with light emitted from a display 420 of the wearable device 101. The display area of the display may be formed in the lens through which ambient light passes. Since the wearable device 101 combines the ambient light and the light emitted from the display, the user may see an image in which a real object recognized by the ambient light and a virtual object formed by the light emitted from the display are mixed.

According to an embodiment, the wearable device 101 may execute a function related to video see-through (VST) and/or the virtual reality (VR). In the state in which the user wears the wearable device 101, the wearable device 101 may include a housing covering the user's eyes. The wearable device 101 may include a display disposed on a first surface (e.g., a first surface 310 of FIG. 3A) facing the eye, in the state. The wearable device 101 may include a camera (e.g., cameras 260-7, 260-8, 260-9, 260-10, 260-11, and 260-12) disposed on a second surface (e.g., a second surface 320 of FIG. 3A) opposite to the first surface. Using the camera, the wearable device 101 may obtain frame images including the ambient light. The wearable device 101 may output the frame images to the display disposed on the first surface so that the user recognizes the ambient light through the display. The display area of the display disposed on the first surface may be formed by one or more pixels included in the display. The wearable device 101 may synthesize the virtual object in the frame images outputted through the display in order for the user to recognize the virtual object together with the real object recognized by the ambient light.

According to an embodiment, the wearable device 101 may provide a user experience based on the mixed reality (MR), using a virtual space. The wearable device 101 may generate a virtual space mapped to an external space, by recognizing the external space (e.g., a real space) including the wearable device 101. Space recognition performed by the wearable device 101 may include SLAM and/or space mapping (e.g., scene understanding).

Referring to FIG. 4, the wearable device 101 according to an embodiment may include at least one of a processor (e.g., including processing circuitry) 410, a memory 415, a camera 425, a display 420, a sensor 430, and a communication circuit 435. The processor 410, the memory 415, the camera 425, the display 420, the sensor 430, and the communication circuit 435 may be electrically and/or operably coupled with each other by an electronical component such as a communication bus 402. Hereinafter, an operably coupling of hardware components may refer, for example, to a direct connection or an indirect connection between hardware components being established by wire or wirelessly so that the second hardware component is controlled by the first hardware component among the hardware components. Although illustrated based on different blocks, the disclosure is not limited thereto, and a portion (e.g., at least a portion of the processor 410, the memory 415, and the communication circuit 435) of the hardware components illustrated in FIG. 4 may be included in a single integrated circuit, such as a system on a chip (SoC). A type and/or number of the hardware components included in the wearable device 101 is not limited as illustrated in FIG. 4. For example, the wearable device 101 may include only a portion of the hardware component illustrated in FIG. 4. Elements (e.g., layers and/or modules) in memory described below may be in a logically divided state. The elements in the memory may be included in a hardware component that is distinct from the memory. An operation performed by the processor 410 using each of the elements in the memory is an embodiment, and the processor 410 may perform an operation different from the operation through at least one element among the elements in the memory.

According to an embodiment, the processor 410 of the wearable device 101 may include a hardware component for processing data based on one or more instructions. The hardware component for processing data may include, for example, an arithmetic and logic unit (ALU), a field programmable gate array (FPGA), and/or a central processing unit (CPU). The number of the processors 410 may be one or more. For example, the processor 410 may have a structure of a multi-core processor such as a dual core, a quad core, or a hexa core. The processor 410 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to an embodiment, the memory 415 of the wearable device 101 may include a hardware component for storing data and/or an instruction inputted to the processor 410 or outputted from the processor 410. The memory 415 may include, for example, volatile memory such as random-access memory (RAM) and/or non-volatile memory such as read-only memory (ROM). The volatile memory may include, for example, at least one of dynamic RAM (DRAM), static RAM (SRAM), Cache RAM, and pseudo SRAM (PSRAM). The non-volatile memory may include, for example, at least one of programmable ROM (PROM), erasable PROM (EPROM), electrically erasable PROM (EEPROM), flash memory, hard disk, compact disk, and embedded multi media card (eMMC).

In an embodiment, the display 420 of the wearable device 101 may output visualized information to the user of the wearable device 101. For example, the display 420 may visualize information provided from the processor 410 that includes a circuit such as a graphic processing unit (GPU). The display 420 may include a flexible display, a flat panel display (FPD), and/or an electronic paper. The FPD may include a liquid crystal display (LCD), a plasma display panel (PDP), and/or one or more light emitting diodes (LEDs). The LED may include an organic LED (OLED).

In an embodiment, the camera 425 of the wearable device 101 may include optical sensors (e.g., a charged coupled device (CCD) sensor, a complementary metal oxide semiconductor (CMOS) sensor) that generate an electrical signal indicating a color and/or brightness of the light. The optical sensors included in the camera 425 may be disposed in the form of a 2 dimensional array. The camera 425 may generate 2 dimensional frame data corresponding to light reaching the optical sensors of the 2 dimensional array, by obtaining electrical signals of each of a plurality of optical sensors substantially simultaneously. For example, photo data captured using the camera 425 may refer, for example, to a 2 dimensional frame data obtained from the camera 425. For example, video data captured using the camera 425 may refer, for example, to a sequence of a plurality of 2 dimensional frame data obtained from the camera 425 according to a frame rate. The camera 425 may be disposed toward a direction in which the camera 425 receives the light and may further include a flashlight for outputting the light toward the direction.

According to an embodiment, the wearable device 101 is an example of the camera 425 and may include a plurality of cameras disposed toward different directions. Among the plurality of cameras, a first camera may be referred to as a motion recognition camera (e.g., motion recognition camera 260-2 and 260-3 of FIG. 2B), and a second camera may be referred to as an eye tracking camera (e.g., an eye tracking camera 260-1 of FIG. 2B). The wearable device 101 may identify a position, shape, and/or gesture of a hand using the image obtained using the first camera. The wearable device 101 may identify a direction of the gaze of the user wearing the wearable device 101 using the image obtained using the second camera. For example, a direction in which the first camera faces and a direction in which the second camera faces may be opposite.

According to an embodiment, the sensor 430 of the wearable device 101 may generate electronic information that may be processed by the processor 410 and/or the memory 415 of the wearable device 101, from non-electronic information related to the wearable device 101. The information may be referred to as sensor data. The sensor 430 may include a global positioning system (GPS) sensor for detecting the geographic location of the wearable device 101, an image sensor, an illumination sensor, and/or a time-of-flight (ToF) sensor, and an inertial measurement unit (IMU) for detecting a physical motion of the wearable device 101.

In an embodiment, the communication circuit 435 of the wearable device 101 may include a hardware component for supporting transmission and/or reception of an electrical signal between the wearable device 101 and an external electronic device. The communication circuit 435 may include at least one of, for example, a modem (MODEM), an antenna, and an optic/electronic (O/E) converter. The communication circuit 435 may support the transmission and/or reception of the electrical signal based on various types of protocols such as ethernet and local area network (LAN), wide area network (WAN), wireless fidelity (WiFi), Bluetooth, bluetooth low energy (BLE), ZigBee, long term evolution (LTE), 5G new radio (NR), and/or 6G.

According to an embodiment, in the memory 415 of the wearable device 101, one or more instructions (or commands) indicating calculation and/or operation to be performed on data by the processor 410 of the wearable device 101 may be stored. A set of one or more instructions may be referred to as a firmware, an operating system, a process, a routine, a sub-routine, and/or an application. For example, the wearable device 101 and/or the processor 410 may perform at least one of the operations of FIGS. 5, 7, 9, and 10 when a set of a plurality of instructions distributed in the form of the operating system, firmware, driver, and/or application is executed. Hereinafter, the application being installed in the wearable device 101 may refer, for example, to one or more instructions provided in the form of the application being stored in the memory 415, and the one or more applications are stored in an executable format (e.g., a file with an extension designated by the operating system of the wearable device 101) by the processor 410. For example, the application may include a program and/or a library related to a service provided to the user.

Referring to FIG. 4, programs installed in the wearable device 101 may be included in any one layer among different layers including an application layer 440, a framework layer 450, and/or a hardware abstraction layer (HAL) 480 based on a target. For example, in the hardware abstraction layer 480, programs (e.g., a module, or a driver) designed to target the hardware (e.g., the display 420, the camera 425, and/or the sensor 430) of the wearable device 101 may be classified. The framework layer 450 may be referred to as a XR framework layer, in terms of including one or more programs for providing an extended reality (XR) service. For example, FIG. 4 illustrates by dividing layers in the memory 415, but the layers may be logically divided. However, the disclosure is not limited thereto. According to an embodiment, the layers may be stored in a designated area in the memory 415.

For example, in the framework layer 450, programs (e.g., a location tracker 471, a space recognizer 472, a gesture tracker 473, and/or a gaze tracker 474, a face tracker 475) designed to target at least one of the hardware abstraction layer 480 and/or the application layer 440 may be included. The programs included in the framework layer 450 may provide an application programming interface (API) executable based on another program.

For example, in the application layer 440, a program designed to target a user who controls the wearable device 101 may be included. As an example of the programs included in the application layer 440, an extended reality (XR) system user interface (UI) and/or a XR application 442 are illustrated, but the disclosure is not limited thereto. For example, programs (e.g., a software application) classified as the application layer 440 may cause execution of a function supported by programs classified as the framework layer 450, by calling an application programming interface (API).

For example, based on execution of a XR system UI 441, the wearable device 101 may display one or more visual objects for performing interaction with the user to use the virtual space on the display 420. The visual object may refer, for example, to an object that is deployable in the screen for information transmission and/or interaction, such as text, image, icon, video, button, check box, radio button, text box, slider, and/or table. The visual object may be referred to as a visual guide, a virtual object, a visual element, a UI element, a view object, and/or a view element. The wearable device 101 may provide the user with a service capable of controlling functions available in the virtual space based on the execution of the XR system UI 441.

Referring to FIG. 4, a lightweight renderer 443 and/or a XR plug-in 444 are illustrated to be included in the XR system UI 441, but are not limited thereto. For example, the XR system UI 441 may cause execution of a function supported by the lightweight renderer 443 and/or the XR plug-in 444 included in the application layer 440.

For example, based on the execution of the lightweight renderer 443, the wearable device 101 may obtain a resource (e.g., API, system process, and/or library) used to define, create, and/or execute a rendering pipeline that is allowed partial change. The lightweight renderer 443 may be referred to as a lightweight render pipeline in terms of defining the rendering pipeline that is allowed partial change. The lightweight renderer 443 may include a renderer (e.g., a prebuilt renderer) built before execution of the software application. For example, the wearable device 101 may obtain the resource (e.g., API, system process, and/or library) used to define, create, and/or execute the entire rendering pipeline based on execution of the XR plug-in 444. The XR plug-in 444 may be referred to as an open XR native client in terms of defining (or setting) the entire rendering pipeline.

For example, the wearable device 101 may display a screen indicating at least a portion of the virtual space on the display 420 based on execution of the XR application 442. A XR plug-in 444-1 included in the XR application 442 may be referred to the XR plug-in 444 of the XR system UI 441. Among a description of the XR plug-in 444-1, a description that overlap with a description of the XR plug-in 444 may be omitted. The wearable device 101 may cause execution of a screen composition manager 451 based on the execution of the XR application 242.

According to an embodiment, the wearable device 101 may provide a virtual space service based on the execution of the screen composition manager 451. For example, the screen composition manager 451 may include a platform (e.g., Android platform) for supporting the virtual space service. Based on the execution of the screen composition manager 451, the wearable device 101 may display the posture of the virtual object indicating the user's posture rendered using the data obtained through the sensor 430 on the display. The screen composition manager 451 may be referred to as a composition presentation manager (CPM).

For example, the screen composition manager 451 may include a runtime service 452. For example, the runtime service 452 may be referred to as an OpenXR runtime module. The wearable device 101 may be used to provide at least one of a user's pose prediction function, a frame timing function, and/or a space input function through the wearable device 101, based on the execution of the runtime service 452. For example, the wearable device 101 may be used to perform rendering for the virtual space service to the user based on the execution of the runtime service 452. For example, based on the execution of the runtime service 452, an application (e.g., unity or OpenXR native application) may be implemented.

For example, the screen composition manager 451 may include a renderer. The wearable device 101 may render a screen to be displayed on the display, by compositing a pass-through layer (or a pass-through node) obtained through virtual layers (or a virtual node) rendered based on the sensor data (e.g., sensing data obtained through the camera 425 or the sensor 430), using the renderer, through the screen composition manager 451. The virtual layers may be referred to as a virtual node and/or a virtual surface. The wearable device 101 may render each of the virtual layers or may render all of the virtual layers through the screen composition manager 451.

For example, a perception abstract layer 460 may be used for data exchange between the screen composition manager 451 and a perception service layer 470. In terms of being used for the data exchange between the screen composition manager 451 and the perception service layer 470, the perception abstract layer 460 may be referred to as an interface. For example, the perception abstract layer 460 may be referred to as an OpenPX and/or a perception platform abstract layer (PPAL). The perception abstract layer 460 may be used for a perception client and a perception service.

According to an embodiment, the perception service layer 470 may include one or more programs for processing data obtained from the sensor 430 (or the camera 425). The one or more programs may include at least one of the location tracker 471, the space recognizer 472, the gesture tracker 473, the gaze tracker 474, and/or the face tracker 475. The type and/or number of one or more programs included in the perception service layer 470 is not limited to that illustrated in FIG. 4.

For example, the wearable device 101 may identify the posture of the wearable device 101, using the sensor 430, based on execution of the location tracker 471. Based on the execution of the location tracker 471, the wearable device 101 may identify the 6 degrees of freedom pose (6 dof pose) of the wearable device 101, using data obtained using the camera 425 and the IMU. The location tracker 471 may be referred to as a head tracking (HeT) module.

For example, the wearable device 101 may be used to configure the surrounding environment of the wearable device 101 (or the user of the wearable device 101) as a 3 dimensional virtual space based on execution of the space recognizer 472. The wearable device 101 may reconstruct the surrounding environment of the wearable device 101 in 3 dimensions, using the data obtained using the camera 425 based on the execution of the space recognizer 472. The wearable device 101 may identify at least one of a plane, an inclination, and a staircase, based on the surrounding environment of the wearable device 101 reconstructed in 3 dimensions based on the execution of the space recognizer 472. The space recognizer 472 may be referred to as a scene understanding (SU) module.

For example, the wearable device 101 may be used to identify (or recognize) a pose and/or gesture of the user's hand of the wearable device 101 based on execution of the gesture tracker 473. For example, the wearable device 101 may identify the pose and/or gesture of the user's hand, using data obtained from the sensor 430, based on the execution of the gesture tracker 473. For example, the wearable device 101 may identify the pose and/or gesture of the user's hand, based on the data (or an image) obtained using the camera 425, based on the execution of the gesture tracker 473. The gesture tracker 473 may be referred to as a hand tracking (HaT) module, and/or a gesture tracking module.

For example, the wearable device 101 may identify (or track) movement of the user's eyes of the wearable device 101 based on execution of the gaze tracker 474. For example, the wearable device 101 may identify the movement of the user's eyes, using data obtained from at least one sensor, based on the execution of the gaze tracker 474. For example, the wearable device 101 may identify the movement of the user's eyes, based on data obtained using the camera 425 (e.g., the eye tracking camera 260-1 of FIGS. 2A and 2B) and/or an infrared light emitting diode (IR LED) based on the execution of the gaze tracker 474. The gaze tracker 474 may be referred to as an eye tracking (ET) module, and/or a gaze tracking module.

For example, the perception service layer 470 of the wearable device 101 may further include the face tracker 475 for tracking the user's face. For example, the wearable device 101 may identify (or track) the movement of the user's face and/or the user's facial expression based on execution of the face tracker 475. The wearable device 101 may estimate the user's facial expression based on the movement of the user's face based on the execution of the face tracker 475. For example, the wearable device 101 may identify the movement of the user's face and/or the user's facial expression, based on data (e.g., an image) obtained using the camera, based on the execution of the face tracker 475.

Referring to FIG. 4, the wearable device 101 may establish a connection with the server 401 each other, based on a wired network and/or a wireless network. The wired network may include a network such as Internet, local area network (LAN), wide area network (WAN), Ethernet, or a combination thereof. The wireless network may include a network such as long term evolution (LTE), 5g new radio (NR), wireless fidelity (WiFi), Zigbee, near field communication (NFC), Bluetooth, bluetooth low-energy (BLE), or a combination thereof. Although the wearable device 101 and the server 401 are illustrated to be directly connected, the wearable device 101 and the server 401 may be indirectly connected through an intermediate node (e.g., an intermediate node 130 of FIG. 1) in the network. In terms of being located outside the wearable device 101, the server 401 may be referred to as an external electronic device.

The server 401 according to an embodiment may include at least one of a processor (e.g., including processing circuitry) 410-1, a memory 415-1, and/or a communication circuit 435-1. The processor 410-1, the memory 415-1, and the communication circuit 435-1 may be electronically and/or operably coupled with each other by an electronical component such as a communication bus 402-1. The type and/or number of the hardware component included in the server 401 is not limited to that illustrated in FIG. 4. For example, the server 401 may include only a portion of the hardware component illustrated in FIG. 4. The processor 410-1, the memory 415-1, and the communication circuit 435-1 included in the server 401 may include a hardware component and/or a circuit corresponding to the processor 410, the memory 415, the display 420, and the communication circuit 435 of the wearable device 101. Hereinafter, in order to reduce repetition, a description of hardware and/or software included in the server 401 may be omitted in a range overlapping the wearable device 101.

The server 401 according to an embodiment may be an example of a server that provides a XR service logged in by the wearable device 101. The server 401 may transmit information related to the virtual space logged in by the wearable device 101 to the wearable device 101 through the communication circuit 435-1. The server 401 may receive a movement of the wearable device 101 from the wearable device 101 and may transmit information for rendering a portion of the virtual space corresponding to the received movement to the wearable device 101. The server 401 may transmit information related to another external electronic device distinct from the wearable device 101 to the wearable device 101. The information related to the other external electronic device may include information indicating a place of an avatar of another user that is distinct from the user of the wearable device 101 entering the virtual space.

As described above, the wearable device 101 according to an embodiment may obtain information on the avatar of the other user entering the virtual space from the server 401 while displaying at least a portion of the virtual space on the display 420. The wearable device 101 may display the avatar of the other user that is not included in at least a portion of the virtual space on at least a portion of the display 420. The wearable device 101 may identify a positional relationship between the avatar of the user and the avatar of the other user of the wearable device 101, in order to display the avatar of the other user on at least a portion thereof. The wearable device may display the avatar of the other user on at least a portion of the display 420 corresponding to the positional relationship. The wearable device 101 may provide a notification indicating the avatar of the other user entering the virtual space to the user, based on displaying the avatar of the other user on the at least a portion.

Figure 5:
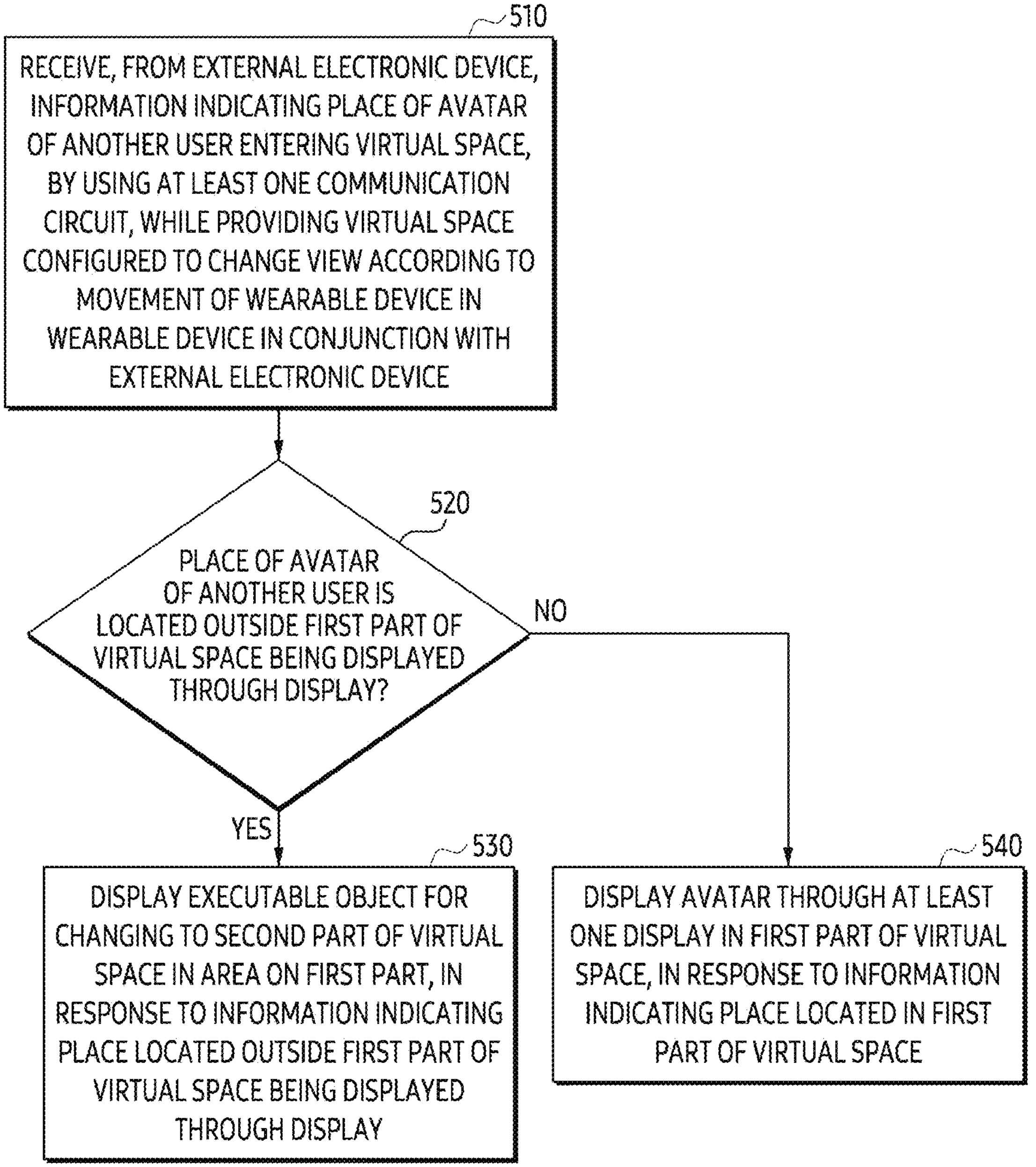
FIG. 5 is a flowchart illustrating an example operation of a wearable device according to various embodiments.
Figure 6:
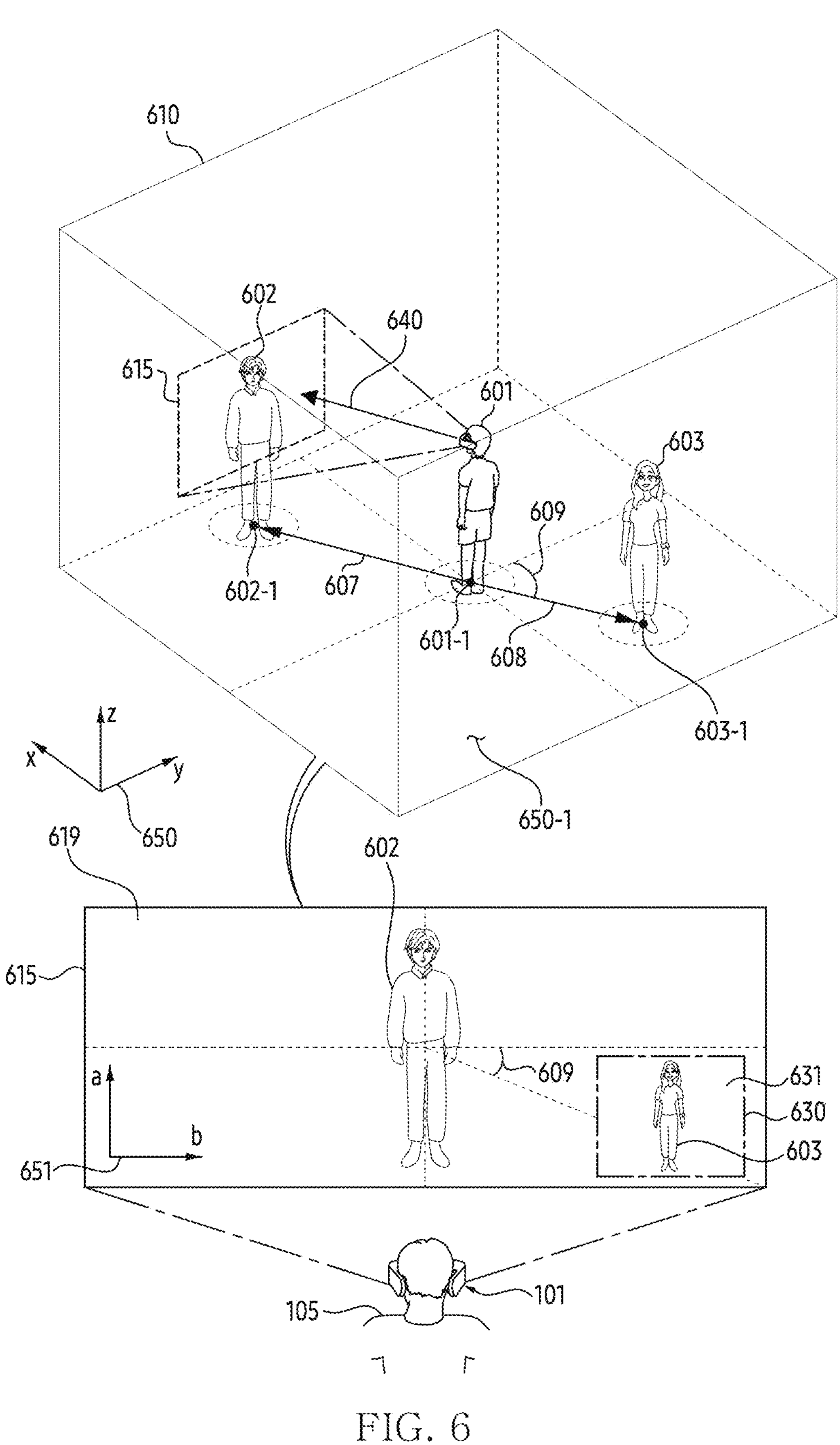
FIG. 6 is a diagram illustrating an example operation in which a wearable device provides a position of an avatar according to various embodiments.

FIG. 5 is a flowchart illustrating an example operation of a wearable device according to various embodiments. FIG. 6 is a diagram illustrating an example operation in which a wearable device provides a position of an avatar according to various embodiments. The wearable device of FIG. 5 and a wearable device 101 of FIG. 6 may include the wearable device 101 of FIG. 4. At least one of the operations of FIG. 5 may be performed by the wearable device 101 of FIG. 4. At least one of the operations of FIG. 5 may be controlled by a processor 410 of FIG. 4. Each of the operations of FIG. 5 may be performed sequentially, but is not necessarily performed sequentially. For example, an order of each of the operations may be changed, and at least two operations may be performed in parallel.

Referring to FIG. 5, in operation 510, the wearable device according to an embodiment may receive, from an external electronic device, information indicating a place where an avatar of another user entering the virtual space is located, using at least one communication circuit, while providing a virtual space configured to change a view (or an image indicating the view) displayed on a display according to a movement of the wearable device in the wearable device in conjunction with the external electronic device (e.g., a server 401 of FIG. 4). For example, the movement of the wearable device may be obtained based on information (e.g., head tracking information) indicating a movement of the user's head obtained using a location tracker (e.g., a location tracker 471 of FIG. 4).

For example, the wearable device may log in (or enter) a virtual space provided by the external electronic device, using an avatar corresponding to a user account of the user of the wearable device. In a state of being logged in to the virtual space, the wearable device may display a portion of the virtual space on the display based on the movement of the avatar that is changed according to the movement of the wearable device. The wearable device may change the view of the virtual space shown (or displayed) to the user, by controlling the movement of the avatar according to the movement of the wearable device. The wearable device may display a screen indicating the view of the virtual space that is changed according to the movement of the wearable device on the display, by interworking with the external electronic device (e.g., the server 410 of FIG. 4). For example, the wearable device 101 may obtain user head tracking information that tracks a posture, direction, and/or position of the user's head according to the movement of the wearable device 101. The wearable device 101 may change the view of the virtual space shown (or displayed) to the user, by changing the direction of the avatar (or the avatar's posture) using the obtained head tracking information.

Referring to FIG. 6, the wearable device 101 according to an embodiment may log in to a virtual space 610, using an avatar 601 corresponding to a user 105. The wearable device 101 may enter the virtual space 610 based on execution of a XR application 442 of FIG. 4. The virtual space 610 may be referred to as a Copresence space accessible to a plurality of users (or an electronic device corresponding to the users) using a metaverse service provided by a server (e.g., the server 410 of FIG. 4).

For example, the wearable device 101 may display a portion of a virtual space corresponding to a direction 640 of the viewpoint according to the movement of the wearable device obtained through a sensor (e.g., a sensor 430 of FIG. 4) on a display (e.g., a display 420 in FIG. 4). A part of the virtual space may be referred to a field of view (FoV) 615 of the wearable device corresponding to the direction 640 of the viewpoint. The part of the virtual space may be shown to a user wearing the wearable device 101 and may indicate a place of the virtual space corresponding to the direction 640 of the viewpoint. The direction 640 of the viewpoint may be changed by a movement of the avatar 601 corresponding to the movement of the wearable device 101. The direction 640 of the viewpoint may indicate a direction between a position 601-1 of the avatar 601 of the virtual space 610 and the FoV 615 for displaying the part of the virtual space 610.

Referring to FIG. 5, in operation 520, the wearable device according to an embodiment may identify whether a place of the avatar of another user is located outside a first part of the virtual space being displayed through the display.

Referring to FIG. 6, the wearable device 101 according to an embodiment may obtain a screen based on the FoV 615 corresponding to the direction 640 of the viewpoint for display of the first part from the external electronic device (e.g., the server 401 of FIG. 4). The wearable device 101 may display the screen on the display. The screen may indicate a place (e.g., the first part of the virtual space 610) located from the position 601-1 in which the avatar 601-1 is located in the virtual space 610 toward the direction 640 of the viewpoint.

For example, while displaying the screen, the wearable device 101 may receive information indicating a place of the avatar 602 and 603 of another user (e.g., another user distinct from the user of the wearable device 101) entering the virtual space 610 from the external electronic device, using the communication circuit. The wearable device 101 may identify a relative positional relationship between a position of the avatar 601 and a position of the avatar 602 and 603 of the other user, using information indicating the place of the avatar 602 and 603 of the other user. Based on identifying the relative positional relationship, the wearable device 101 may identify whether the position of the avatar 602 and 603 of the other user are located in the first part corresponding to the screen. The wearable device 101 may indicate the entry of the avatar 602 and 603 of the other user into the virtual space 610 according to whether the position of the avatar 602 and 603 of the other user is located in the first part.

Referring to FIG. 5, in case that the place of the avatar of the other user is located outside the first part of the virtual space (operation 520—Yes), in operation 530, the wearable device according to an embodiment may display an executable object for changing to the second part of the virtual space in the area on the first part in response to the information indicating the place located outside the first part of the virtual space being displayed through the display. The place may include a position of the avatar of the other user distinct from the user of the wearable device in the virtual space. The second part may correspond to a FoV based on a direction from an avatar corresponding to the wearable device toward the position of the avatar of the other user.

Referring to FIG. 6, the wearable device 101 according to an embodiment may identify the entry of the avatar 603 corresponding to the other user distinct from the user of the wearable device 101 while displaying a screen 619 indicating the first part of the virtual space 610 on the display. The wearable device 101 may receive information on access (or entry) of the avatar 603 and a place (or a position 603-1) where the avatar 603 is located in the virtual space 610 from the external electronic device (e.g., the server 401 of FIG. 4). Based on identifying the position 603-1 of the avatar 603 located outside the first part, the wearable device 101 may display an executable object 631 for changing to a second part different from the first part in the area 630 of the display. The position 603-1 of the avatar 603 may be located in the second part.

For example, the wearable device 101 may identify a position in the virtual space 610 formed based on a 3 dimensional coordinate axis 650. The wearable device 101 may identify a position on a reference plane 650-1 (e.g., a xy plane) formed based on the 3 dimensional coordinate axis 650. The reference plane 650-1 may refer, for example, to a plane for supporting at least one object in the virtual space 610 based on a physical engine used to define the virtual space 610 among three planes (e.g., the xy plane, an yz plane, and a zx plane) formed based on the 3 dimensional coordinate axis 650. The physical engine may include a program used to implement a physical system (or physical phenomenon) that may occur in a real space distinct from the virtual space 610 in a virtual reality.

For example, the wearable device 101 may identify the positional relationship between the avatar 601 and the other avatar 603 on the reference plane 650-1. The wearable device 101 may identify the position 603-1 of the avatar 603 based on the position 601-1 of the avatar 601. The direction 640 of the viewpoint may correspond to one axis (e.g., a x axis) among the 3 dimensional coordinate axis 650. The wearable device 101 may identify the relative positional relationship between the position 601-1 of the avatar 601 and the position 603-1 of the avatar 603 based on the direction 640 of the viewpoint. The wearable device 101 may identify a direction 608 toward the position 603-1 from the position 601-1 on the reference plane 650-1. The wearable device 101 may obtain an angle between the direction 640 and the direction 608 of the viewpoint. For example, the wearable device 101 may obtain an angle 609 between another direction (e.g., a +y direction) perpendicular to the direction 640 (e.g., a +x direction) and the direction 608 based on the 3 dimensional coordinate axis 650 formed based on the position 601-1 of the avatar 601. An operation in which the wearable device 101 obtains the relative positional relationship between the position of the avatar 601 and the position of the avatar 603 is not limited to the above-described embodiment.

While displaying the screen 619 indicating the first part on the display, the wearable device 101 according to an embodiment may display the executable object 631 for indicating the avatar 603 entering the virtual space 610 in the area 630, based on identifying the position 603-1 of the avatar 603 located outside the first part. The executable object 631 may be displayed overlappingly on at least a portion of the screen 619. For example, the executable object 631 may be translucent. At least a portion of the screen 619 may be shown by the user, by penetrating at least a portion of the translucent executable object 631. However, the disclosure is not limited thereto.

For example, the wearable device 101 may determine the position of the area 630. The wearable device 101 may determine the position of the area 630 to be displayed on the display according to the angle 609 identified based on the position 601-1 of the avatar 601. The wearable device 101 may determine the position of the area 630 to be displayed on the display based on a 2 dimensional coordinate axis 651 corresponding to the reference plane 650-1. The wearable device 101 may map a center point in the FoV 615 to the position 601-1 of the avatar 601. The wearable device 101 may determine the position of the area 630, using the angle 609 indicating the relative positional relationship between the avatar 601 and the avatar 603, using the 2 dimensional coordinate axis 651 formed based on the center point. For example, the wearable device 101 may display the area 630 on at least a portion of the display corresponding to the angle 609 from the center point. By displaying at least a portion of the avatar 603 on the display using the angle 609, the wearable device 101 may map information indicating a position in the screen 619 formed based on the 2 dimensional coordinate axis 651 and a position in the virtual space 610 defined based on the 3 dimensional coordinate axis 650.

The wearable device 101 according to an embodiment may display the executable object 631 through the area 630 of the display in the first part of the virtual space 610. The area 630 may include a screen indicating the FoV based on the direction 608. The area 630 may be used to display the second part of the virtual space 610 disposed from the position 601-1 in the virtual space 610 toward the direction 608. The wearable device 101 may display a screen (e.g., the executable object 631) indicating the second part in the area 630. The position 603-1 of the avatar 603 identified by the wearable device 101 may be included in the second part. The second part may be distinct from the first part viewed by the avatar 601. The screen may include a view entering the virtual space. The screen may include a screen to be displayed on the display when the wearable device 101 controls the avatar 601 and the viewpoint of the avatar 601 faces the direction 608.

Referring to FIG. 5, in case that the place of the avatar of another user is located in the first part of the virtual space (operation 520—No), in operation 540, the wearable device according to an embodiment may display the avatar through the display in the first part of the virtual space in response to information indicating the place located in the first part of the virtual space.

Referring to FIG. 6, the wearable device 101 according to an embodiment may receive information indicating the entry of the avatar 602 from the external electronic device (e.g., the server 401 of FIG. 4). The wearable device 101 may identify the position 602-1 of the avatar 602 based on receiving the information. The wearable device 101 may identify the relative positional relationship between the position 601-1 and the position 602-1 based on receiving the information. The wearable device 101 may identify a direction 607 from the position 601-1 toward the position 602-1. The wearable device 101 may identify a place in the virtual space 610 in which the avatar 602 is located based on identifying the direction 607. The wearable device 101 may identify that the place in the virtual space 610 is located in the first part corresponding to the FoV 615. By identifying the avatar 602 located in the FoV 615, the wearable device 101 may display the screen 619 indicating the FoV 615 including the avatar 602 on the display instead of displaying an executable object corresponding to the avatar 602. While displaying the screen 619, since the avatar 602 entering the virtual space 610 is included in the FoV 615 corresponding to the screen 619, the wearable device 101 does not need to provide the entry of the avatar 602 to the user through the executable object 631, so that the display of the executable object corresponding to the avatar 602 may be refrained. In other words, in response to confirmation that the position 602-1 (or a place including the position) of the avatar 602 is located in the first part (e.g., a portion of the virtual space corresponding to the screen 619) of the virtual space 610, the wearable device 101 may display the avatar 602 (or the screen 619 including the avatar 602) located in the first part through the display.

As described above, the wearable device 101 according to an embodiment may identify the position 602-1 and 603-1 of the other avatar 602 and 603 entering the virtual space 610 based on the position 601-1 of the avatar 601 in the virtual space 610. The wearable device 101 may identify the position 602-1 and 603-1 while displaying the screen 619 indicating the first part in the virtual space 610 based on the direction 640 corresponding to the viewpoint of the avatar 601. The wearable device 101 may identify the avatar 602 located in the FoV 615 and the avatar 603 located outside the FoV 615 based on the position 602-1 and 603-1. Since the wearable device 101 may display the avatar 602 through the screen 619, the wearable device 101 may not display an executable object corresponding to the avatar 602. Since the wearable device 101 may not display the avatar 603 through the screen 619, the wearable device 101 may display the executable object 631 for indicating the entry of the avatar 603 on the area 630 of the display defined using the angle 609 identified based on the positional relationship between the avatar 601 and the avatar 603. While displaying a screen indicating a portion of the virtual space 610, the wearable device 101 may notify the user that the other avatars enter the virtual space independently of the positions of the other avatars logged in the virtual space.

Figure 7:
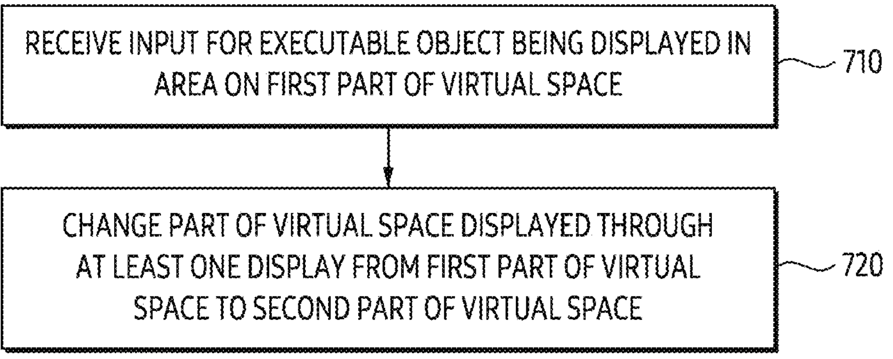
FIG. 7 is a flowchart illustrating an example operation of a wearable device according to various embodiments.
Figure 8:
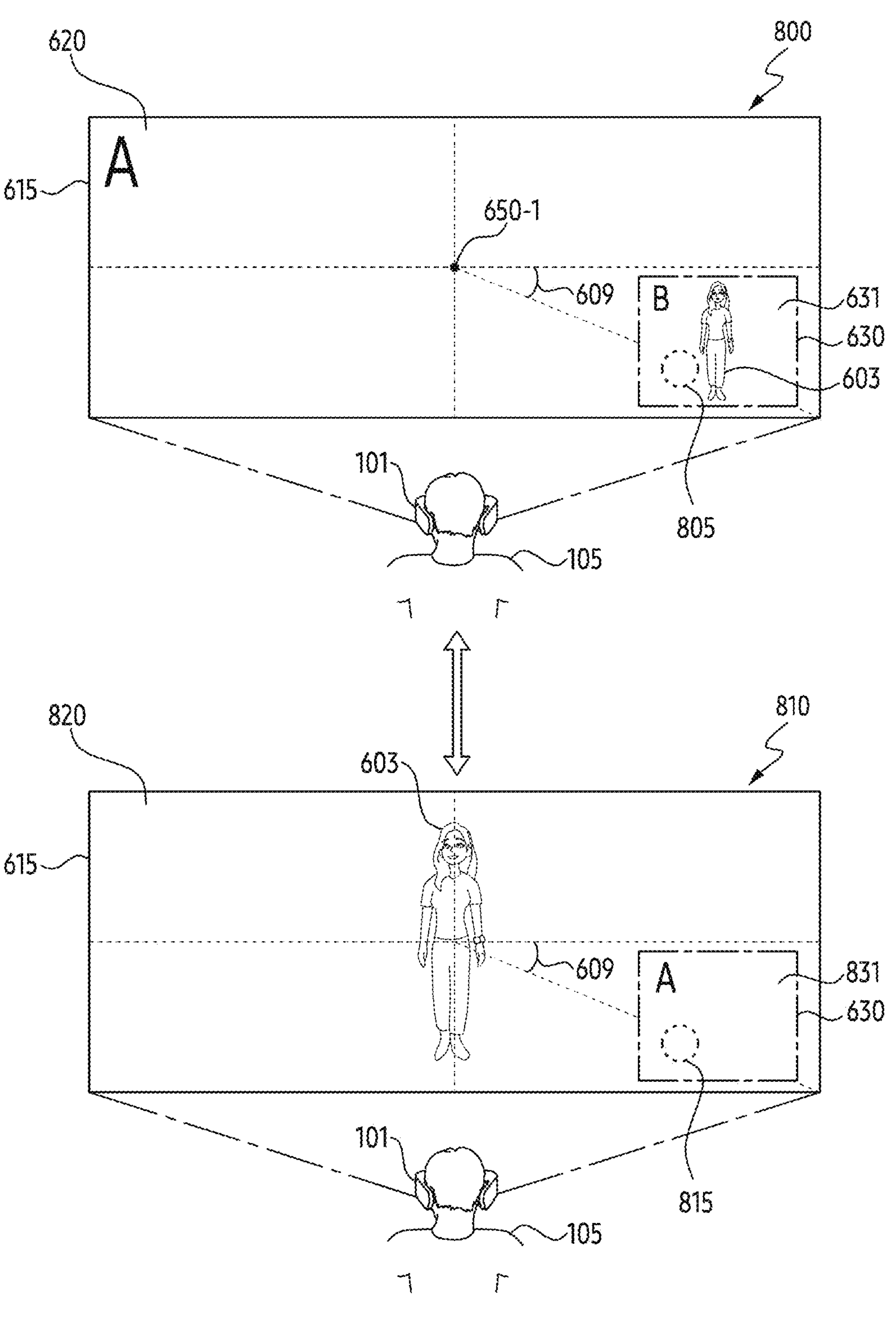
FIG. 8 is a diagram illustrating an example of a screen displayed by a wearable device in response to an input for an executable object according to various embodiments.

FIG. 7 is a flowchart illustrating an example operation of a wearable device according to various embodiments. FIG. 8 is a diagram illustrating an example screen displayed by a wearable device in response to an input for an executable object according to various embodiments. The wearable device of FIG. 7 and a wearable device 101 of FIG. 8 may include the wearable device 101 of FIG. 4. At least one of the operations of FIG. 7 may be performed by the wearable device 101 of FIG. 4. At least one of the operations of FIG. 7 may be controlled by a processor 410 of FIG. 4. Each of the operations of FIG. 7 may be performed sequentially, but is not necessarily performed sequentially. For example, an order of each of the operations may be changed, and at least two operations may be performed in parallel. At least one of the operations of FIG. 7 may be related to at least one of the operations of FIG. 5.

Referring to FIG. 7, the wearable device according to an embodiment may receive an input for an executable object being displayed in an area on a first part of a virtual space, in operation 710. After performing operation 530 of FIG. 5, the wearable device may perform the operation 710.

Referring to FIG. 8, in a state 800, the wearable device 101 according to an embodiment may display a screen 620 on the display. The screen 620 may be included in a screen 619 of FIG. 6. While displaying the screen 620 based on a FoV 615 of an avatar (e.g., an avatar 601 of FIG. 6) corresponding to a user 105, the wearable device 101 may receive information indicating access of an avatar 603 corresponding to another user from an external electronic device (e.g., a server 401 of FIG. 4). The information may include information indicating a position of the avatar 603 in the virtual space (e.g., a virtual space 610 of FIG. 6). Based on identifying the position of the avatar 603, the wearable device 101 may obtain a relative position of the avatar 603 based on the position (e.g., a position 601-1 of FIG. 6) of the corresponding avatar (e.g., the avatar 601 of FIG. 6) of the user 105. In response to confirming that the position of the avatar 603 is located outside the first part of the virtual space corresponding to the FoV 615, the wearable device 101 may display an executable object 631 in an area 630. The wearable device 101 may identify an angle 609 based on the relative position of the avatar 603 based on the obtained position (e.g., the position 601-1 of FIG. 6) of the corresponding avatar (e.g., the avatar 601 of FIG. 6) of the user 105. The wearable device 101 may determine the position of the area 630 based on the angle 609 based on a central point 650-1 of the FoV 615 (or the display area of the display). The wearable device 101 may display the executable object 631 in the area 630 on the screen 620 indicating the first part of the virtual space corresponding to the FoV 615. The wearable device 101 may notify the user of the access of the avatar 603 by displaying the executable object 631. For example, independent of displaying the executable object 631, the wearable device 101 may output a notification sound indicating the access of the avatar 603 through a speaker.

The wearable device 101 according to an embodiment may receive an input 805 for the executable object 631 being displayed in the area 630. The wearable device 101 may activate a timer in response to the display of the executable object 631. The wearable device 101 may receive the input 805 while the timer is activated. For example, the wearable device 101 may detect expiration of the timer before the input 805 is received. In response to the detection, the wearable device 101 may stop displaying the executable object 631. The wearable device 101 may stop displaying the executable object 631 by causing the executable object 631 to gradually disappear. However, the disclosure is not limited thereto.

For example, the wearable device 101 may change the view of the virtual space shown to the user 105 based on receiving the input 805 for the executable object 631. Based on receiving the input, the wearable device may change the posture of the avatar (e.g., the avatar 601 of FIG. 6) corresponding to the user 105, even though it does not receive the movement of the wearable device 101 for controlling the avatar (e.g., the avatar 601 of FIG. 6) corresponding to the user 105. Based on receiving the input, the wearable device 101 may change the posture of the avatar corresponding to the user 105 so that the avatar (e.g., the avatar 601 of FIG. 6) corresponding to the user 105 in the virtual space looks at the avatar 603. The wearable device 101 may change the posture of the avatar (e.g., the avatar 601 of FIG. 6) corresponding to the user 105, from the position of the avatar (e.g., the avatar 601 of FIG. 6) corresponding to the user 105, so that a direction (e.g., a direction 608 of FIG. 6) toward the position of the avatar 603 matches a direction (e.g., a direction 640 of FIG. 6) of the avatar's viewpoint corresponding to the user 105. The wearable device 101 may change the posture of the avatar by controlling the entire avatar (e.g., the avatar 601 of FIG. 6) corresponding to the user 105, or may change the posture of the avatar by controlling a portion (e.g., a part corresponding to the head) of the avatar. The wearable device 101 may enter the state 810 by changing the posture of the avatar.

Referring to FIG. 7, in operation 720, the wearable device according to an embodiment may change a part of the virtual space displayed through the display from the first part of the virtual space to a second part of the virtual space. The first part of the virtual space may correspond to the FoV 615 of the avatar the (e.g., avatar 601 of FIG. 6) corresponding to the user (e.g., the user 105 of FIG. 1) of the wearable device (e.g., the wearable device 101 of FIG. 1). The second part of the virtual space may include a place of another avatar 603 that is not included in the first part. The wearable device may change the part of the virtual space from the first part to the second part in response to an input for the executable object. For example, the wearable device may change the FoV of the avatar by controlling the avatar in response to the input for the executable object. The wearable device may change the part of the virtual space displayed on the display from the first part to the second part, based on changing the FoV of the avatar.

Referring to FIG. 8, the wearable device 101 according to an embodiment may enter the state 810, in response to the input 805, in the state 800. The wearable device 101 may gradually expand a size of the executable object 631 displayed in the area 630 to converge to a size of the FoV 615. The wearable device 101 may display a screen 820 on the display, based on gradually expanding the size of the executable object 631. For example, in response to the input 805, the wearable device 101 may control the avatar so that the direction (e.g., the direction 640 of FIG. 6) of the avatar's viewpoint matches another direction (e.g., the direction 608 of FIG. 6) from the position of the avatar toward the position of the other avatar 603. Based on controlling the avatar, the wearable device 101 may display a screen corresponding to the FoV (e.g., the FoV 615 of FIG. 6) that is changed according to the movement of the viewpoint of the avatar on the display.

The wearable device 101 according to an embodiment may display another executable object 831 for resuming the display of the first part (e.g., a portion of the virtual space corresponding to the screen 620) through the display in the screen 820 (e.g., a screen corresponding to the second part of the virtual space) displayed according to the input 805. The wearable device 101 may display the other executable object 831 in the area 630. In the state 810, the position of the area 630 may be the same as the position of the area 630 in the state 800, but the disclosure not limited thereto. For example, the position of the area 630 in the state 810 may be opposite to the position of the area 630 in the state 800.

For example, the other executable object 831 may include a thumbnail image of the first part of the virtual space. The thumbnail image of the first part of the virtual space may include the screen 620 displayed on the display when the input 805 is received. The other executable object 831 may include a screen indicating the first part of the virtual space corresponding to the direction (e.g., the direction 640 of FIG. 6) of the viewpoint of the avatar at a timing of receiving the input 805, in response to displaying the screen 820. The screen may include information about the first part of the virtual space in real time in conjunction with a timing of displaying the screen 820. The other executable object 831 may be displayed in the area 630 on the screen 820 (e.g., the screen corresponding to the second part of the virtual space) indicating the position of the first part of the virtual space. The wearable device 101 may activate a timer having a designated time in response to the display of the other executable object 831. For example, the wearable device 101 may identify the input 815 for the other executable object 831 as indicating an execution cancellation of the operation for the input 805. Time of the timer for displaying the other executable object 831 for receiving the input 815 indicating the execution cancellation may be shorter than time of a timer for displaying the executable object 631.

For example, the wearable device 101 may receive the input 815 while the timer is activated in response to the display of the other executable object 831. For example, before receiving the input 815, the wearable device 101 may stop displaying the other executable object 831 based on detecting the expiration of the timer. The wearable device 101 may stop displaying the other executable object 831, based on causing the other executable object 831 to gradually disappear, by reducing a size of the other executable object 831.

The wearable device 101 according to an embodiment may enter the state 800 in response to the input 815 for the other executable object 831. In response to the input 815, the wearable device 101 may control the avatar to change to the posture of the avatar (e.g., the avatar 601 of FIG. 6) corresponding to the user 105 before receiving the input 805. The wearable device 101 may display the screen 620 indicating the first part of the virtual space on the display based on controlling the avatar.

As described above, the wearable device 101 according to an embodiment may determine the area 630 including the executable object 631 to be displayed on the display based on a relative positional relationship between the avatar (e.g., the avatar 601 of FIG. 6) of the user 105 in the virtual space and the avatar 603 of the other user. The wearable device 101 may guide the position where the avatar 603 corresponding to the executable object 631 logs into the virtual space, to the user, using the position of the area 630. In response to the input 805 for the executable object 631, the wearable device 101 may display the screen 820 indicating a place where the avatar 603 is located, on the display. In response to the display of the screen 820, the wearable device 101 may display the other executable object 831 on the area 630 of the screen 820. The wearable device 101 may display the executable object 831 corresponding to the screen 620 displayed before identifying the input 805, on the area 630. The wearable device 101 may resume displaying the screen 620 in response to the input 815 for the executable object 831. The wearable device 101 may cause the user to more easily change the viewpoint of the avatar, using the executable object 631 and 831 displayed in the area 630.

Figure 9:
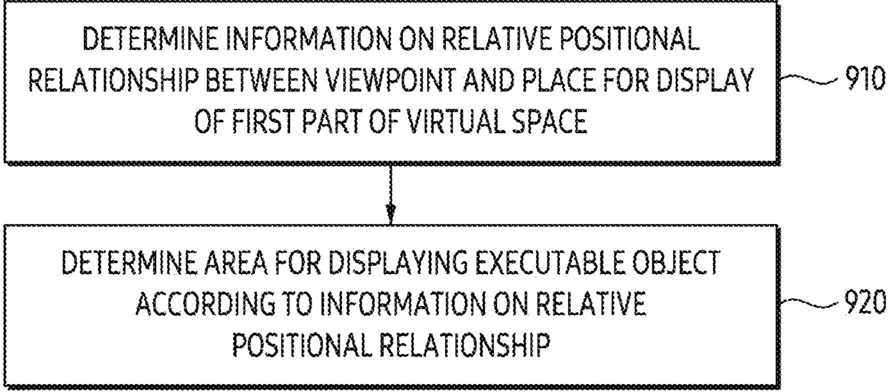
FIG. 9 is a flowchart illustrating an example operation of a wearable device according to various embodiments.

FIG. 9 is a flowchart illustrating an example operation of a wearable device according to various embodiments. At least one of the operations of FIG. 9 may be performed by a wearable device 101 of FIG. 4. At least one of the operations of FIG. 9 may be controlled by a processor 410 of FIG. 4. Each of the operations of FIG. 9 may be performed sequentially, but is not necessarily performed sequentially. For example, an order of each of the operations may be changed, and at least two operations may be performed in parallel. At least one of the operations of FIG. 9 may be related to at least one of the operations of FIG. 5.

Referring to FIG. 9, in operation 910, the wearable device according to an embodiment may determine information on a relative positional relationship between a viewpoint and a place for display of a first part of a virtual space. The wearable device may receive, from a server, a position where an avatar corresponding to a user is located in the virtual space. The wearable device may identify the first part of the virtual space using a FoV based on a direction of the avatar's viewpoint according to the avatar's posture. The wearable device may display a screen indicating the first part on the display based on identifying the first part of the virtual space. The wearable device may receive information related to another avatar logged in to the virtual space from the server while displaying the screen on the display. The wearable device may receive the information including a position in the virtual space of the other avatar. The wearable device may identify a place including the position of the other avatar. The place may indicate at least a part of a second part of the virtual space to be included in the FoV of the avatar based on a direction (e.g., a direction 640 of FIG. 6) toward the position of the other avatar from the avatar's position based on the avatar corresponding to the user. The wearable device may obtain an angle (e.g., ab angle 609 of FIG. 6) with respect to a designated axis (e.g., a y-axis of FIG. 6) based on a direction from the position of the avatar corresponding to the user on a reference plane (e.g., a reference plane 650-1 of FIG. 6) toward the position of the other avatar. The angle may refer, for example, to the relative positional relationship between the position of the avatar corresponding to the user and the position of the other avatar.

Referring to FIG. 9, in operation 920, the wearable device according to an embodiment may determine an area for displaying an executable object according to the information on the relative positional relationship. For example, the wearable device may determine a position of an area to be displayed on a screen formed based on 2 dimensions, using an angle obtained using the virtual space formed based on 3 dimensions. The area may be used to display the executable object. A size and/or position of the area may be adjusted by a user input. The size and/or position of the area may be changed according to the position of objects in the virtual space. The executable object may include an image indicating the place, and/or position information for the place. The wearable device may guide the position of the other avatar in the virtual space, to the user, by displaying the position of the area based on the relative positional relationship.

Figure 10:
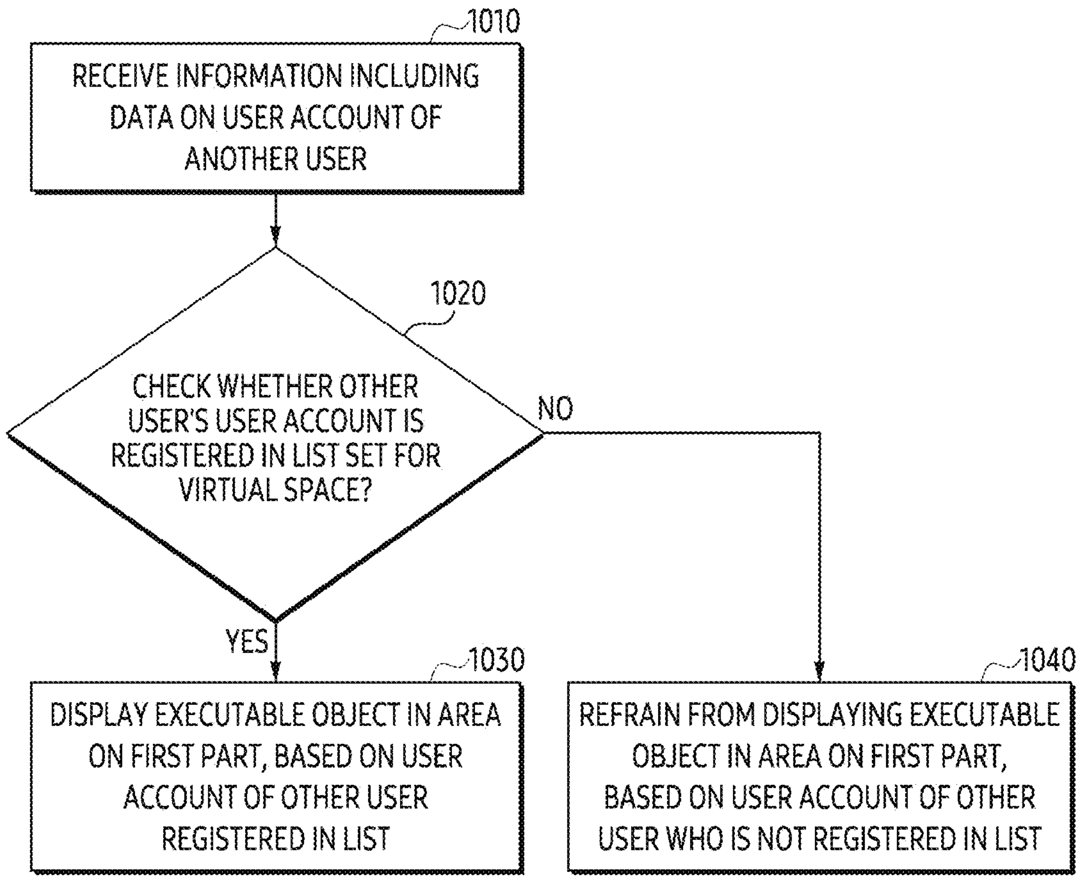
FIG. 10 is a flowchart illustrating an example operation in which a wearable device identifies an avatar corresponding to a registered user account, according to various embodiments.
Figure 11:
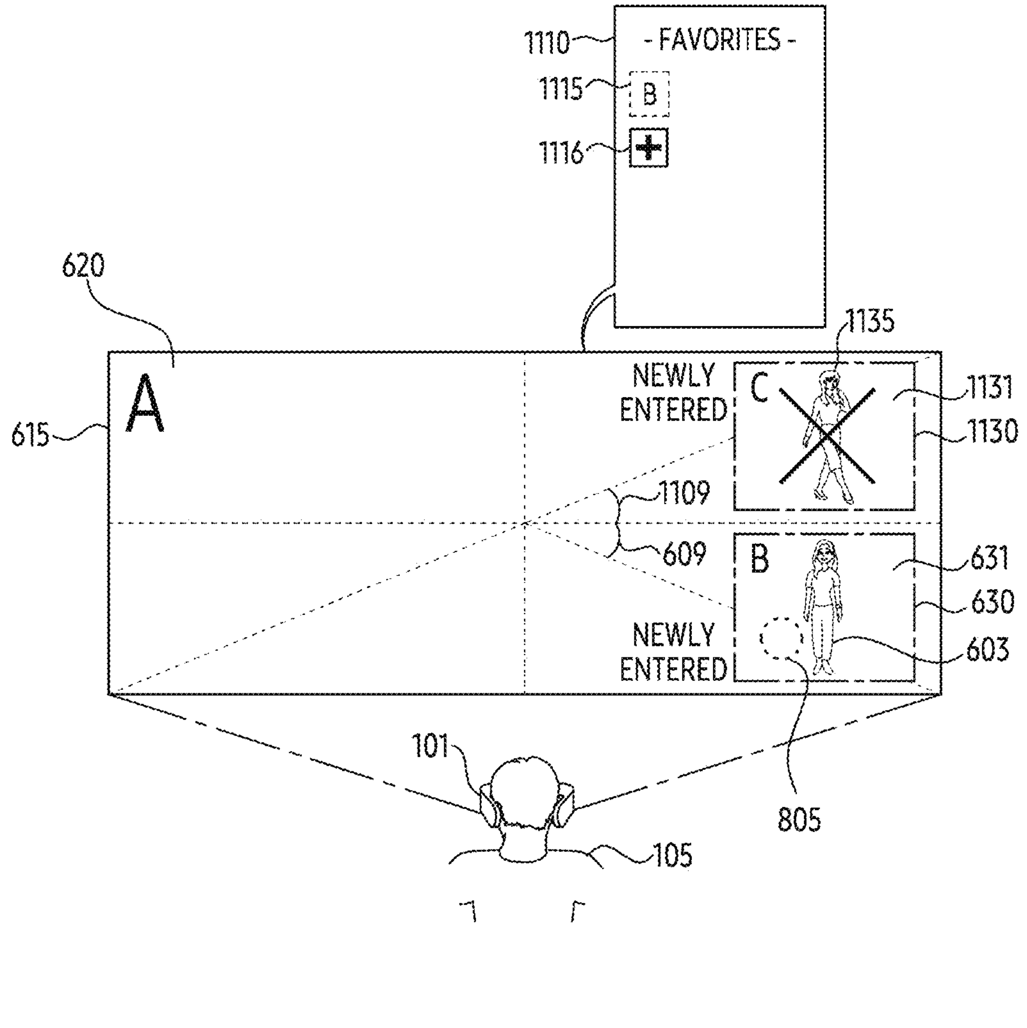
FIG. 11 is a diagram illustrating an example operation in which a wearable device displays an avatar based on a registered user account, according to various embodiments.

FIG. 10 is a flowchart illustrating an example operation in which a wearable device identifies an avatar corresponding to a registered user account, according to various embodiments. FIG. 11 is a diagram illustrating an example operation in which a wearable device displays an avatar based on a registered user account, according to various embodiments. The wearable device of FIGS. 10 and 11 may include a wearable device 101 of FIG. 4. At least one of the operations of FIG. 10 may be performed by the wearable device 101 of FIG. 4. At least one of the operations of FIG. 10 may be controlled by a processor 410 of FIG. 4. Each of the operations of FIG. 10 may be performed sequentially, but is not necessarily performed sequentially. For example, an order of each of the operations may be changed, and at least two operations may be performed in parallel. At least one of the operations of FIG. 10 may be related to at least one of the operations of FIG. 5.

Referring to FIG. 10, in operation 1010, the wearable device according to an embodiment may receive information including data on a user account of another user. The wearable device may receive the information including the data on the user account of the other user from a server (e.g., a server 401 of FIG. 4) when an avatar corresponding to the other user accesses the virtual space. The information may include information indicating a position of the avatar in the virtual space.

Referring to FIG. 10, in operation 1020, the wearable device according to an embodiment may check whether the other user's user account is registered in a list set for the virtual space. The list set for the virtual space may include information indicating the user account of the other user. The list may include information on an avatar corresponding to the user account of the other user. The list may be obtained by a user of the wearable device registering the user account of the other user. The wearable device may determine whether to provide the user with information indicating entry of the avatar corresponding to the user account of the other user, using the list.

Referring to FIG. 11, in a state 1100, the wearable device 101 according to an embodiment may display a screen 620 indicating a first portion of the virtual space on the display through a FoV 615 based on a direction (e.g., a direction 640 of FIG. 6) of the viewpoint of the avatar (e.g., an avatar 601 of FIG. 6). While displaying the screen 620, the wearable device 101 may receive information indicating login of avatars 603 and 1135 corresponding to a plurality of user accounts of a plurality of users from the server (e.g., the server 401 of FIG. 4). The wearable device 101 may determine whether to provide information indicating entry of the avatars 603 and 1135 to the user based on receiving the information.

For example, the wearable device 101 may determine whether to provide information indicating the entry of the avatars 603 and 1135, using a list 1110. The wearable device 101 may identify a registered user account from among the plurality of users, using the list 1110. For example, the wearable device 101 may receive an input indicating a user account to be registered in the list 1110, using the visual object 1116 in the list 1110. However, the disclosure is not limited thereto. The list 1110 may be used, according to an embodiment, to block reception (or provide to the user after receiving) of information related to the avatar corresponding to the user account.

Referring to FIG. 10, in case that the user account of the other user registered in the list is identified (operation 1020—Yes), in operation 1030, the wearable device 101 may display an executable object in the area on a first part, based on the user account of the other user registered in the list.

Referring to FIG. 11, the wearable device 101 according to an embodiment may identify an avatar 603 corresponding to a registered user account 1115. The wearable device 101 may identify a relative positional relationship between the avatar 603 for the registered user account 1115 and an avatar (e.g., the avatar 601 of FIG. 6) corresponding to a user 105. In case that the avatar 603 is included in the first part of the virtual space viewed by the avatar corresponding to the user 105, the wearable device 101 may display a screen including the avatar 603 on the display. In case that the avatar 603 is located outside the first part, the wearable device 101 may display an executable object indicating a second part distinct from the first part in the area 630 of the screen. The relative positional relationship may include information on an angle 609 between the avatar 603 in the virtual space and the avatar corresponding to the user 105 from a designated axis (e.g., a y-axis of FIG. 6). The wearable device 101 may display an executable object 631 in the area 630 disposed according to the angle 609.

Referring to FIG. 10, in case that the user account of the other user who is not registered in the list is identified (operation 1020—No), in operation 1040, it is possible to refrain from displaying the executable object in the area on the first part based on the user account of the other user who is not registered in the list.

Referring to FIG. 11, the wearable device 101 may receive information indicating that an avatar 1135 corresponding to the user account of the other user who is not registered in the list 1110 is logged in the virtual space, from the server. In response to receiving the information, the wearable device may refrain from displaying an executable object 1131 for indicating the avatar 1135 corresponding to the user account not registered in the list 1110.

For example, the wearable device 101 may receive information on a position of the avatar 1135 in the virtual space. The wearable device 101 may obtain a relative positional relationship between the position of the avatar 1135 and the avatar corresponding to the user 105. For example, in the virtual space, the relative positional relationship between the position of the avatar 1135 and the avatar (e.g., the avatar 601 of FIG. 6) corresponding to the user 105 may include information on an angle 1109. The wearable device 101 may determine a position of the executable object 1131 corresponding to the avatar 1135 in the screen 620 based on the angle 1109. In case that the position of the avatar 1135 is located outside the first part of the virtual space corresponding to the screen 620, the wearable device 101 may obtain the executable object 1131 indicating a place (e.g., a third part of the virtual space) including the position of the avatar 1135 on the area 1130. In case that a user account corresponding to the avatar 1135 is not registered in the list 1110, the wearable device 101 may refrain from displaying the executable object 1131, in the area 1130 on the first part, despite the place located outside the first part of the virtual space.

As described above, the wearable device 101 according to an embodiment may determine whether to display the executable object for indicating the entry of the avatar corresponding to the user account according to whether the other user's user account is registered in the list 1110. The wearable device 101 may provide a metaverse environment in which the user 105 may focus on desired information, by providing information related to the other user's avatar that the user 105 wants or blocking information related to the other user's avatar that the user 105 does not want, using the list 1110.

Figure 12:
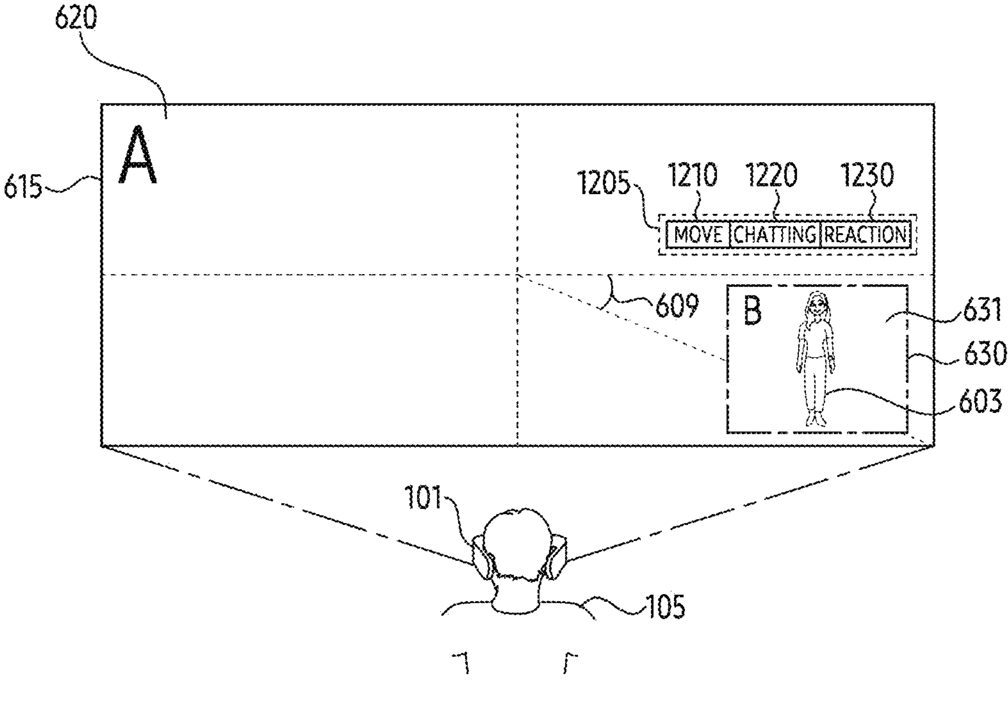
FIG. 12 is a diagram illustrating an example of an interface for a wearable device to perform interaction with a displayed avatar according to various embodiments.

FIG. 12 is a diagram illustrating an example interface for a wearable device to perform interaction with a displayed avatar according to various embodiments. A wearable device 101 of FIG. 12 may include the wearable device 101 of FIG. 4.

Referring to FIG. 12, the wearable device 101 according to an embodiment may display an executable object 631 in an area 630 of a screen 620 together with the screen 620, in a state 1200. The state 1200 may be included in a state 800 of FIG. 8.

In response to the display of the executable object 631, the wearable device 101 according to an embodiment may display an interaction interface 1205 for performing interaction with an avatar 603 corresponding to the executable object 631 (or for communication with another user corresponding to the avatar 603) through a display in association with the executable object 631. The interaction interface 1205 may be disposed adjacent to the executable object 631 outside the executable object 631. For example, the interaction interface 1205 may be displayed in the executable object 631.

For example, the interaction interface 1205 may include an icon 1210 for changing a position of an avatar (e.g., an avatar 601 of FIG. 6) corresponding to the user 105, an icon 1220 for chatting with the avatar 603 (or the other user corresponding to the avatar 603), and/or an icon 1230 for changing a movement of the avatar corresponding to the user 105.

For example, in response to an input for the icon 1210, the wearable device 101 may control the avatar corresponding to the user 105 to move from the position (e.g., a position 601-1 of FIG. 6) of the avatar corresponding to the user 105 to a position adjacent to the avatar 603. The wearable device 101 may change the position of the avatar corresponding to the user 105 to the position adjacent to the avatar 603. By changing the position of the avatar to the position adjacent to the avatar 603, the wearable device 101 may provide a visual effect such as the avatar moving instantaneously. The operation in which the wearable device 101 changes the position of the avatar corresponding to the user 105 is not limited to the above-described embodiment.

For example, in response to an input for a visual object 1220, the wearable device 101 may display a user interface for chatting with the avatar 603 (or the other user corresponding to the avatar 603) overlappingly on the screen 620.

For example, in response to an input for the icon 1230, the wearable device 101 may control the avatar (e.g., the avatar 601 of FIG. 6) corresponding to the user 105, based on a movement indicating an emotion (or reaction). The movement indicating the emotion may include movements indicating interactions between avatars, such as movements in which the avatar greets or movements in which the avatar looks at the other avatar (e.g., the avatar 603).

As described above, the wearable device 101 according to an embodiment may display the interaction interface 1205 for performing interacting (or communicating) with the avatar 603 corresponding to the other user on the display, together with an executable object for changing the direction of the avatar's viewpoint. Using the interaction interface 1205, the wearable device 101 may provide a metaverse service that may more easily perform interaction with the avatar entering the virtual space.

Figure 13A:
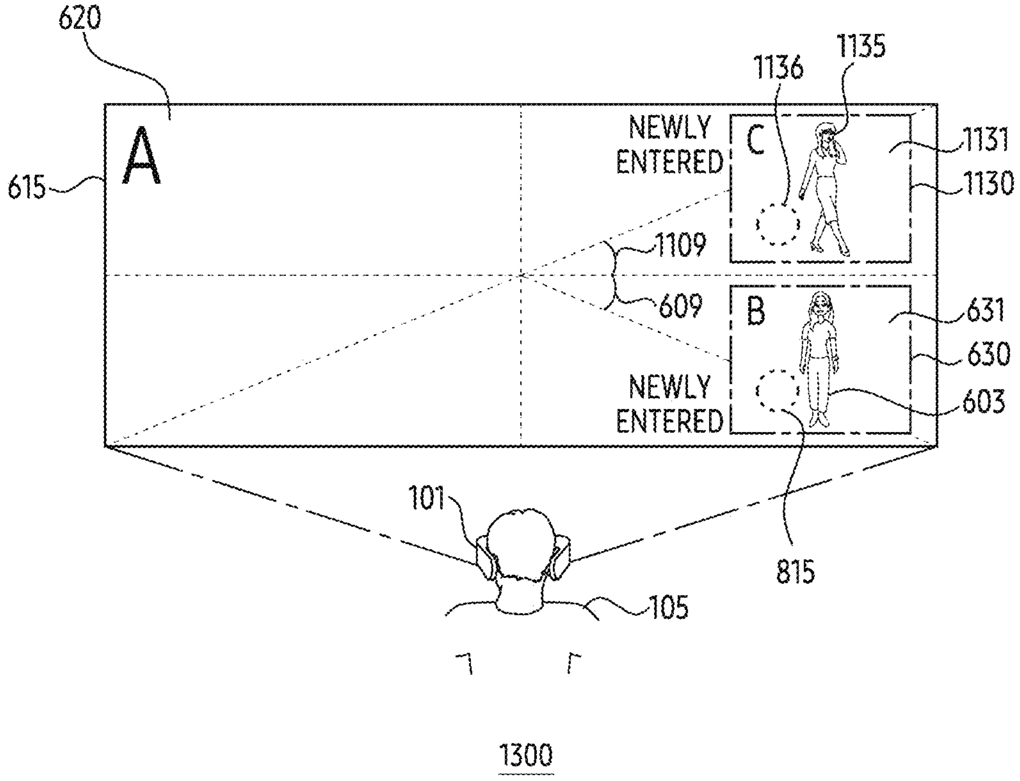
FIGS. 13A and 13B are diagrams illustrating an example operation in which a wearable device changes a position of areas corresponding to avatars based on inputs for selecting a plurality of avatars according to various embodiments.
Figure 13B:
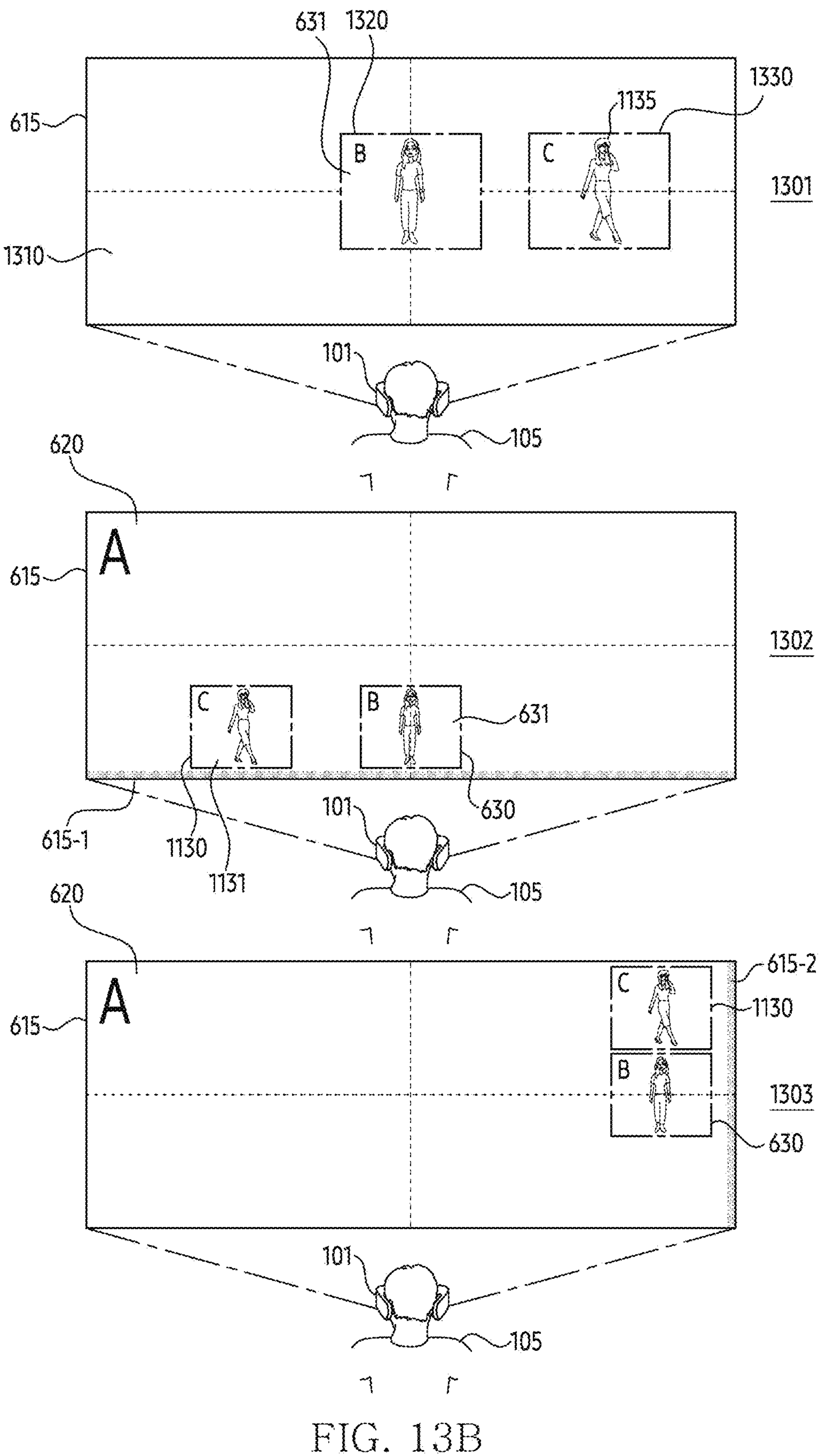

FIGS. 13A and 13B are diagrams illustrating an example operation in which a wearable device changes a position of areas corresponding to avatars based on inputs for selecting a plurality of avatars according to various embodiments.

A wearable device 101 of FIGS. 13A and 13B may include the wearable device 101 of FIG. 4.

Referring to FIG. 13A, in a state 1300, the wearable device 101 according to an embodiment may display a screen 620 indicating a first part of a virtual space on a display, based on a posture of an avatar (e.g., an avatar 601 of FIG. 6). The wearable device 101 may display the first part of the virtual space on the display based on a FoV 615. While displaying the screen 620, the wearable device 101 may receive information indicating entry of avatars 603 and 1135 of other users from an external electronic device (e.g., a server 401). The information may include information indicating a position of the avatars 603 and 1135 in the virtual space.

For example, the wearable device 101 may determine whether to display executable objects 631 and 1131 corresponding to the avatars 603 and 1135 in areas 630 and 1130 of the first part of the virtual space, using the information. The wearable device 101 may display the executable objects 631 and 1131 on the display, based on identifying the position (or place) of the avatars 603 and 1135 located outside the first part of the virtual space.

For example, the wearable device 101 may identify an input for the executable objects 631 and 1131. In case of identifying an input 815 for one executable object 631, the wearable device 101 may change a posture of an avatar corresponding to a user 105 so as to look at an avatar 603 corresponding to the executable object 631.

For example, the wearable device 101 may identify inputs 815 and 1136 for all of the executable objects 631 and 1131 in a designated time. In response to identifying the inputs 815 and 1136 in the designated time, the wearable device 101 may change a position at which executable objects 631 and 1131 are displayed.

Referring to FIG. 13B, the wearable device 101 may display a screen 1310 on the display, in a state 1301, in response to identifying the inputs 815 and 1136, in the designated time. The screen 1310 may include the executable objects 631 and 1131. In response to identifying the inputs 815 and 1136, the wearable device 101 may change a size and/or position of areas for displaying the executable objects 631 and 1131. A size of areas 1320 and 1330 for displaying the executable objects 631 and 1131 may be relatively larger than a size of the areas 630 and 1130 for displaying the executable objects 631 and 1131 in the state 1300. In response to the inputs 815 and 1136, the wearable device 101 may display the executable objects 631 and 1131 instead of the first part of the virtual space based on the FoV 615, so that the user 105 may more easily identify the executable objects 631 and 1131. However, the disclosure is not limited thereto.

Referring to FIG. 13B, in response to identifying the inputs 815 and 1136 in the designated time, the wearable device 101 may change a position of areas (e.g., the areas 630 and 1130 of FIG. 13A) for displaying the executable objects 631 and 1131, in the state 1302. Since the wearable device 101 displays the executable objects 631 and 1131 based on a relative positional relationship of the avatars 603 and 1135 corresponding to each of the areas, the wearable device 101 may cover at least a portion of the first part of the virtual space in the FoV 615. The wearable device 101 may change the position of the areas in order to secure a view of at least a portion of the first part of the virtual space displayed in the FoV 615. The wearable device 101 may dispose the position of the areas 630 and 1130 adjacent to the edge 615-1 of the FoV 615. The wearable device 101 may change a position where the executable objects 631 and 1131 are displayed, by disposing the areas 630 and 1130 adjacent to the edge 615-1. The wearable device 101 may cause the user 105 to more easily process management of the executable objects 631 and 1131, by disposing the areas 630 and 1130 adjacent to the edge 615-1. The wearable device 101 may dispose the executable object, adjacent to another edge 615-2 distinct (or vertical) from the first edge 615-1. An example of a screen in which the wearable device 101 disposes an executable object adjacent to the other edge 615-2 may be indicated as state 1303.

As described above, the wearable device 101 according to an embodiment may display a plurality of executable objects 631 and 1131 on the display, based on the relative positional relationship of the avatars 603 and 1135 corresponding to each of the plurality of executable objects. The wearable device 101 may change the position of the executable objects 631 and 1131 in response to identifying the inputs 815 and 1136 for the executable objects 631 and 1131 in the designated time. The wearable device 101 may secure visibility for the first part of the virtual space displayed in the FoV 615, by changing the position of the executable objects 631 and 1131 in the FoV 615.

Figure 14:
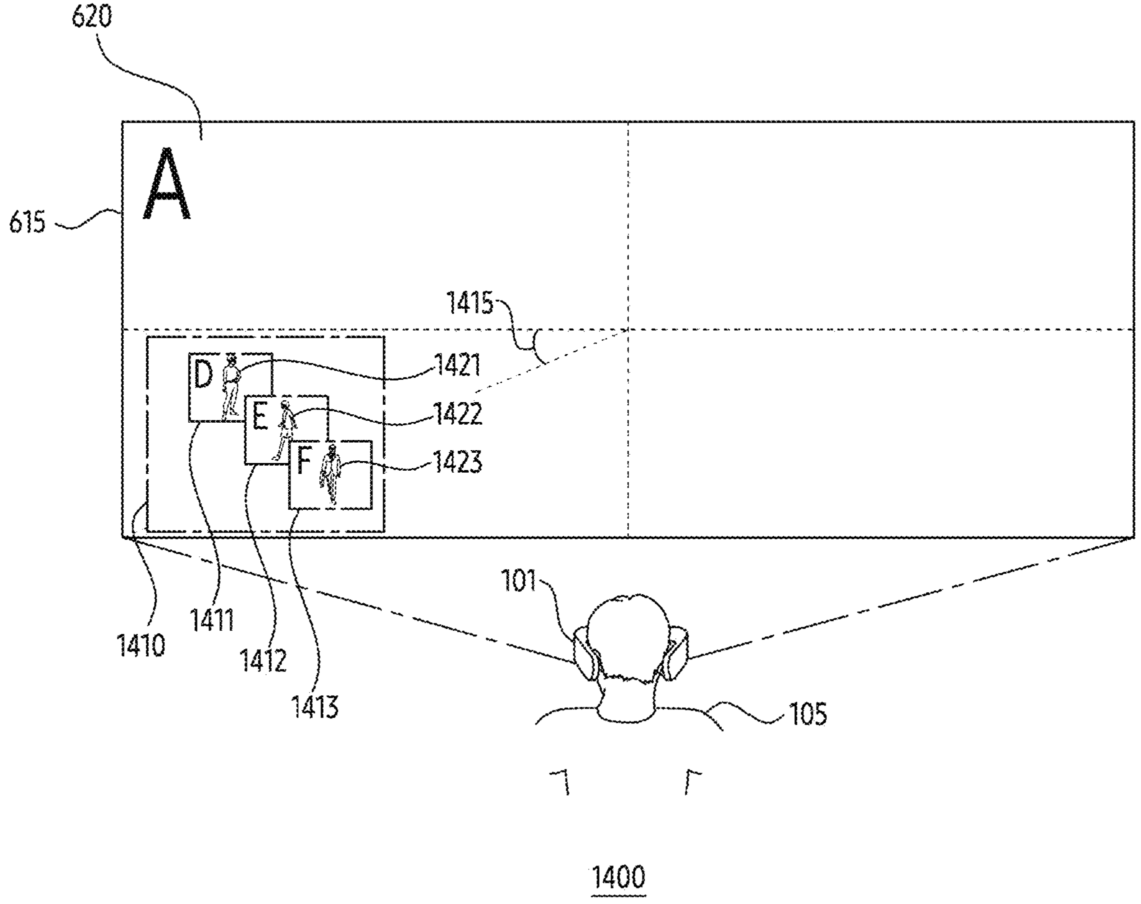
FIG. 14 is a diagram illustrating an example operation in which a wearable device displays areas corresponding to a plurality of avatars according to various embodiments.

FIG. 14 is a diagram illustrating an example operation in which a wearable device displays areas corresponding to a plurality of avatars according to various embodiments. A wearable device 101 of FIG. 14 may include the wearable device 101 of FIG. 4.

Referring to FIG. 14, in a state 1400, the wearable device 101 according to an embodiment may display a screen 620 including areas 1411, 1412, and 1413 for displaying a plurality of executable objects on a display. The wearable device 101 may receive information indicating a login of avatars 1421, 1422, and 1423 to be disposed outside a portion of the virtual space from an external electronic device (e.g., a server 401), while an avatar (e.g., an avatar 601 of FIG. 6) corresponding to a user 105 is located toward a portion of the virtual space based on the FoV 615.

For example, in response to receiving the information, the wearable device 101 may obtain a relative positional relationship between each of the avatars 1421, 1422, and 1423 and an avatar corresponding to the user 105. The wearable device may identify an angle 1415 based on obtaining the relative positional relationship. Based on the angle, the wearable device 101 may determine a position of the areas 1411, 1412, and 1413 for displaying executable objects corresponding to the avatars 1421, 1422, and 1423 on at least a portion of the screen 620.

For example, the wearable device 101 may identify the avatars 1421, 1422, and 1423 included in a designated place, based on obtaining the relative positional relationship. The wearable device 101 may be disposed in the FoV 615, overlappingly on at least a portion of the areas 1411, 1412, and 1413, in order to display the executable objects corresponding to the avatars 1421, 1422, and 1423 included in the designated place. For example, the angle 1415 with respect to the areas 1411, 1412, and 1413 in which at least a portion overlaps may indicate an average angle between each of the avatars 1421, 1422, and 1423 and the avatar corresponding to the user 105. The wearable device 101 may determine a position of another area 1410 including areas 1411, 1412, and 1413, based on the angle 1415. By determining the position of the other area 1410 corresponding to the average angle, the wearable device 101 may change the position of the areas 1411, 1412, and 1413 in the other area 1410.

For example, the wearable device 101 may position, in the FoV 615, at least a portion of the areas 1411, 1412, and 1413, overlapped to each other, based on a designated order. For example, the wearable device 101 may determine an order for overlapping the areas 1411, 1412, and 1413 according to an order of entry into the virtual space.

For example, the wearable device 101 may change the designated order. The wearable device 101 may change the designated order in response to an input for each of the executable objects included in the areas 1411, 1412, and 1413. For example, in case that the wearable device 101 identifies an input for the area 1411, the wearable device 101 may change the designated order so that the area 1411 is disposed relatively above the other areas 1412 and 1413. However, the disclosure is not limited thereto.

As described above, the wearable device 101 according to an embodiment may receive information indicating that the avatars 1421, 1422, and 1423 corresponding to a plurality of users enter at least a portion of the virtual space in the designated time (or at the same time), from the external electronic device. In response to receiving the information, the wearable device 101 may identify a position of the avatars 1421, 1422, and 1423. In case that the position of the avatars 1421, 1422, and 1423 is included in a designated range and the designated range is outside the FoV 615, the wearable device 101 may display the executable objects corresponding to the avatars 1421, 1422, and 1423. In order to display the executable objects in the specified range, the wearable device may position the areas 1411, 1412, and 1413 for displaying the executable objects by overlapping at least portions of the areas 1411, 1412, and 1413. The wearable device 101 may secure visibility of at least a portion of the virtual space displayed in the FoV 615 and visibility of executable objects, by positioning at least a portion of the areas 1411, 1412, and 1413, overlapped to each other.

Hereinafter, an example of an operation for stopping displaying the executable object will be described in greater detail with reference to FIG. 15.

Figure 15:
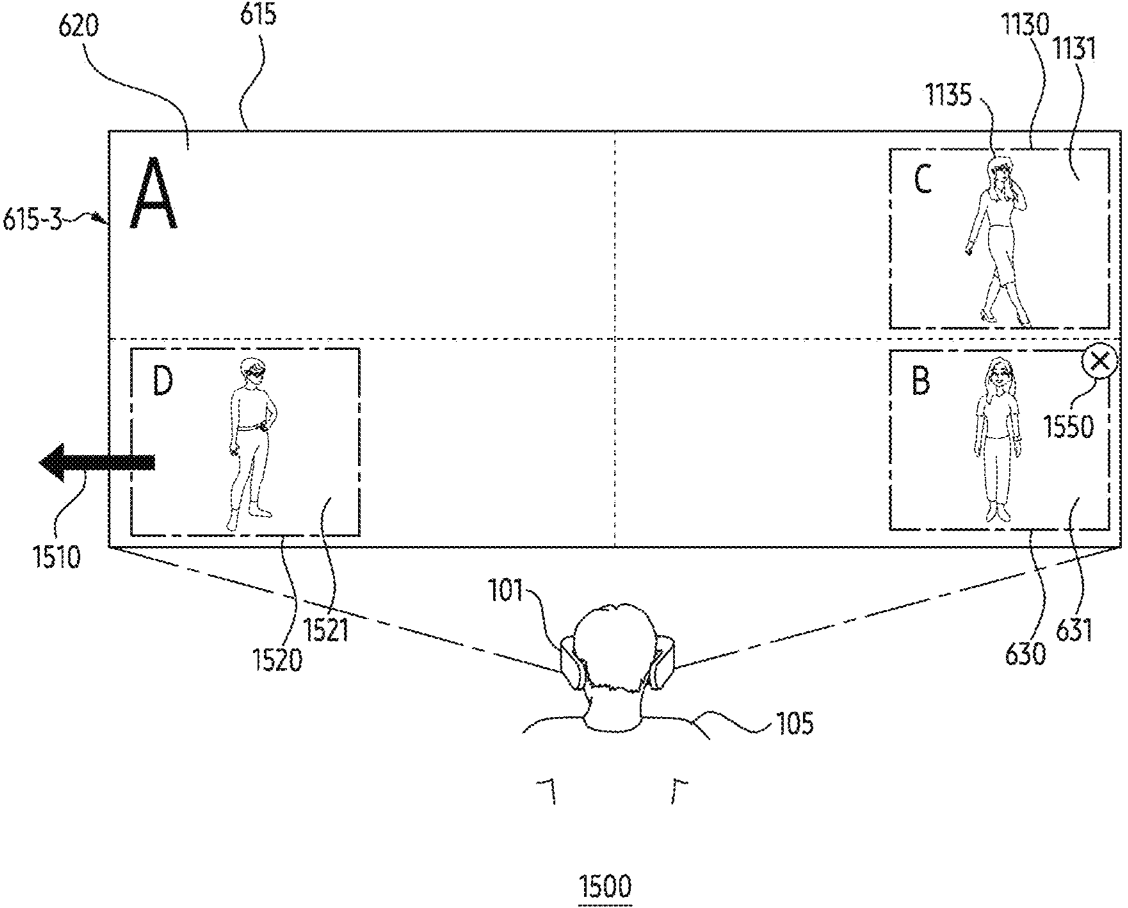
FIG. 15 is a diagram illustrating an example operation for a wearable device to stop displaying an area corresponding to an avatar according to various embodiments.

FIG. 15 is a diagram illustrating an example operation for a wearable device to stop displaying an area corresponding to an avatar according to various embodiments. Referring to FIG. 15, a state 1500 in which a wearable device 101 according to an embodiment displays a screen 620 including a plurality of executable objects 1131, 631, and 1521, is illustrated. The wearable device 101 of FIG. 15 may include the wearable device 101 of FIG. 4.

The wearable device 101 according to an embodiment may receive information related to other avatars entering a virtual space from an external electronic device, while displaying the screen 620 (e.g., a screen indicating a first part of the virtual space included in a viewpoint of an avatar corresponding to a user 105) on the display. The wearable device may identify the other avatars located outside the first part of the virtual space using the information. The wearable device 101 may obtain the executable objects 1131, 631, and 1521 for performing interactions with other avatars based on a relative positional relationship between each of positions of the other avatars and the avatar (e.g., an avatar 601 of FIG. 6) corresponding to the user 105. The wearable device 101 may determine areas 1130, 630, and 1520 on the first part (or a FoV 615) of the virtual space for displaying executable objects 1131, 631, and 1521, based on the relative positional relationship of each of the other avatars.

For example, the wearable device 101 may at least temporarily stop displaying the executable objects 1131, 631, and 1521 included in each of the determined areas 1130, 630, and 1520. The wearable device 101 may at least temporarily stop displaying the executable objects 1131, 631, and 1521 to secure visibility for the first part of the virtual space. For example, at least one executable object 1131 among the executable objects 1131, 631, and 1521 may be translucent.

The wearable device 101 according to an embodiment may activate a timer in response to the display of the executable object 1131. The wearable device 101 may detect expiration of the activated timer. In response to the detection, the wearable device 101 may stop displaying the executable object 1131. The wearable device 101 may stop displaying the executable object 1131 by causing the executable object 1131 to gradually disappear.

The wearable device 101 according to an embodiment may display a visual object 1550 for stopping displaying the executable object 631 among the executable objects 1131, 631, and 1521, overlappingly on the area 630. For example, the wearable device 101 may stop displaying the executable object 631 in response to an input for the visual object 1550.

The wearable device 101 according to an embodiment may obtain an input 1510 for stopping displaying the executable object 1521 among the executable objects 1131, 631, and 1521. For example, the wearable device 101 may identify the input 1510 having a direction from the executable object 1521 toward at least one edge 615-3 among edges of the FoV 615 adjacent to the executable object 1521. The wearable device 101 may stop displaying the executable object 1521, by causing the executable object 1521 to gradually move toward at least one edge 615-3 in response to the input 1510. The operation for the wearable device 101 to stop displaying the executable object is not limited to the above-described embodiment.

The wearable device according to an embodiment may provide the user with a notification indicating login of another avatar, by obtaining information indicating the login of the other avatar to be located in a second part distinct from the first part of the virtual space corresponding to the viewpoint of the avatar logged in the virtual space. A method for a wearable device to efficiently provide the notification to the user may be required.

The wearable device according to an example embodiment as described above may comprise: at least one communication circuit, at least one display configured to align with eyes of a user wearing the wearable device, memory storing instructions, and at least one processor comprising processing circuitry. The instructions, when executed by at least one processor, individually and/or collectively, may cause the wearable device to, while providing a virtual space configured to change a view according to the movement of the wearable device in conjunction with a server, receive information indicating a place of an avatar of an other user entering the virtual space from the server, using the at least one communication circuit. The instructions, when executed by at least one processor, individually and/or collectively, may cause the wearable device to, in response to the receiving, check whether the place is located inside of a first part of the virtual space displayed on the at least one display. The instructions, when executed by at least one processor, individually and/or collectively, may cause the wearable device to, based on determining that the place is located outside of the first part of the virtual space, display an executable object configured to change a part of the virtual space displayed through the at least one display to a second part of the virtual space including the place, in an area on the first part of the virtual space indicating the place, through the at least one display. The instructions, when executed by at least one processor, individually and/or collectively, may cause the wearable device to, based on determining that the place is located inside of the first part of the virtual space, display the avatar in the first part of the virtual space, through the at least one display.

For example, the instructions, when executed by at least one processor, individually and/or collectively, may cause the wearable device to: based on determining that the place is located outside of the first part of the virtual space, display the executable object overlappingly on a position on the at least one display associated with a position of the avatar on a reference plane of the virtual space.

For example, the executable object may include a view through which the avatar enters the virtual space.

For example, the instructions, when executed by at least one processor, individually and/or collectively, may cause the wearable device to: determine information about a relative positional relationship between the place and a viewpoint for the display of the first part of the virtual space, in response to the information indicating the place located outside the first part of the virtual space being displayed on the at least one display. The instructions, when executed by at least one processor, individually and/or collectively, may cause the wearable device to determine the area for the display of the executable object according to the information about the relative positional relationship.

For example, the information about the relative positional relationship may be configured to include data for an angle between a first direction and a second direction. The first direction may be a direction between a position of an avatar of the user on a reference plane of the virtual space and a viewpoint for the display of the first part in the virtual space. The second direction may be a direction between the position and a position of the avatar of the other user on the reference plane.

For example, the instructions, when executed by at least one processor, individually and/or collectively, may cause the wearable device to: receive an input for the executable object being displayed in the area on the first part of the virtual space. The instructions, when executed by at least one processor, individually and/or collectively, may cause the wearable device to change the part of the virtual space displayed through the at least one display from the first part of the virtual space to the second part of the virtual space, in response to the input.

For example, the instructions, when executed by at least one processor, individually and/or collectively, may cause the wearable device to: display an other executable object configured to resume display of the first part of the virtual space, in the second part of the virtual space displayed according to the input, through the at least one display.

For example, the other executable object may include a thumbnail image of the first part of the virtual space.

For example, the other executable object may be displayed in an area on the second part of the virtual space indicating a position of the first part of the virtual space.

For example, the instructions, when executed by at least one processor, individually and/or collectively, may cause the wearable device to: receive an other input for the other executable object displayed in the second part of the virtual space through the at least on display. The instructions, when executed by at least one processor, individually and/or collectively, may cause the wearable device to resume displaying the first part of the virtual space, in response to the other input.

For example, the instructions, when executed by at least one processor, individually and/or collectively, may cause the wearable device to: activate a timer, in response to displaying the executable object. The instructions, when executed by at least one processor, individually and/or collectively, may cause the wearable device to receive the input while the timer is active.

For example, the instructions, when executed by at least one processor, individually and/or collectively, may cause the wearable device to detect expiration of the timer before the input is received. The instructions, when executed by at least one processor, individually and/or collectively, may cause the wearable device to, in response to the detection, stop displaying the executable object in the area on the first part of the virtual space.

For example, the instructions, when executed by at least one processor, individually and/or collectively, may cause the wearable device to stop displaying the executable object, by causing the executable object to disappear.

For example, the instructions, when executed by at least one processor, individually and/or collectively, may cause the wearable device to: display an interaction interface for communication with the other user in the first part of the virtual space, in association with the executable object, through the at least one display.

For example, the interaction interface may be adjacent to the executable object outside the executable object.

For example, the interaction interface may be displayed in the executable object.

For example, the executable object may be translucent.

For example, the instructions, when executed by at least one processor, individually and/or collectively, may cause the wearable device to: receive the information further including data of user account of the other user. The instructions, when executed by at least one processor, individually and/or collectively, may cause the wearable device to check whether the user account of the other user is registered in a list set for the virtual space. The instructions, when executed by at least one processor, individually and/or collectively, may cause the wearable device to, based on the user account of the other user registered in the list, display the executable object, in the area on the first part. The instructions, when executed by at least one processor, individually and/or collectively, may cause the wearable device to, based on the user account of the other user not being registered in the list, refrain from displaying the executable object in the area on the first part, despite the place located outside the first part of the virtual space being displayed through the at least one display.

A method of a wearable device including at least one communication circuit, and at least one display configured to align with eyes of a user wearing the wearable device according to an example embodiment as described above, may comprise, while providing a virtual space configured to change a view according to the movement of the wearable device in conjunction with a server in the wearable device, receiving information indicating a place of an avatar of an other user entering the virtual space from the server, using the at least one communication circuit. The method may comprise, in response to the receiving, checking whether the place is located inside of a first part of the virtual space displayed on the at least one display. The method may comprise, based on determining that the place is located outside of the first part of the virtual space, displaying an executable object configured to change a part of the virtual space displayed through the at least one display to a second part of the virtual space including the place, in an area on the first part of the virtual space indicating the place, through the at least one display. The method may comprise, based on determining that the place is located inside of the first part of the virtual space, displaying the avatar in the first part of the virtual space, through the at least one display.

A non-transitory computer-readable storage medium storing one or more programs according to an example embodiment as described above, wherein the one or more programs, when executed by at least one processor, individually and/or collectively, of a wearable device including at least one communication circuit, and at least one display configured to align with eyes of a user wearing the wearable device, may cause the wearable device to: while providing a virtual space configured to change a view according to the movement of the wearable device in conjunction with a server in the wearable device, receive information indicating a place of an avatar of an other user entering the virtual space from the server, using the at least one communication circuit. The one or more programs, when executed by the wearable device, may cause the wearable device to, in response to the receiving, check whether the place is located inside of a first part of the virtual space that is displayed on the at least one display. The one or more programs, when executed by the wearable device, may cause the wearable device to, based on determining that the place is located outside of the first part of the virtual space, display an executable object configured to change a part of the virtual space displayed through the at least one display to a second part of the virtual space including the place, in an area on the first part of the virtual space indicating the place, through the at least one display. The one or more programs, when executed by the wearable device, may cause the wearable device to, based on determining that the place is located inside of the first part of the virtual space, display the avatar in the first part of the virtual space, through the at least one display.

The effect that may be obtained in the present disclosure is not limited to the above-mentioned effects, and other effects not mentioned will be clearly understood by those who have ordinary knowledge in the technical field to which the present disclosure belongs.

The device described above may be implemented as a hardware component, a software component, and/or a combination of a hardware component and a software component. For example, the devices and components described in the various embodiments may be implemented using one or more general purpose computers or special purpose computers, such as a processor, controller, arithmetic logic unit (ALU), digital signal processor, microcomputer, field programmable gate array (FPGA), programmable logic unit (PLU), microprocessor, or any other device capable of executing and responding to instructions. The processing device may perform an operating system (OS) and one or more software applications executed on the operating system. In addition, the processing device may access, store, manipulate, process, and generate data in response to the execution of the software. For convenience of understanding, there is a case that one processing device is described as being used, but a person who has ordinary knowledge in the relevant technical field may see that the processing device may include a plurality of processing elements and/or a plurality of types of processing elements. For example, the processing device may include a plurality of processors or one processor and one controller. In addition, another processing configuration, such as a parallel processor, is also possible.

The software may include a computer program, code, instruction, or a combination of one or more thereof, and may configure the processing device to operate as desired or may command the processing device independently or collectively. The software and/or data may be embodied in any type of machine, component, physical device, computer storage medium, or device, to be interpreted by the processing device or to provide commands or data to the processing device. The software may be distributed on network-connected computer systems and stored or executed in a distributed manner. The software and data may be stored in one or more computer-readable recording medium.

The method according to an embodiment may be implemented in the form of a program command that may be performed through various computer means and recorded on a computer-readable medium. In this case, the medium may continuously store a program executable by the computer or may temporarily store the program for execution or download. In addition, the medium may be various recording means or storage means in the form of a single or a combination of several hardware, but is not limited to a medium directly connected to a certain computer system, and may exist distributed on the network. Examples of media may include may be those configured to store program instructions, including a magnetic medium such as a hard disk, floppy disk, and magnetic tape, optical recording medium such as a CD-ROM and DVD, magneto-optical medium, such as a floptical disk, and ROM, RAM, flash memory, and the like. In addition, examples of other media may include recording media or storage media managed by app stores that distribute applications, sites that supply or distribute various software, servers, and the like.

While the disclosure has been illustrated and described with reference to various example embodiments, it will be understood that the various example embodiments are intended to be illustrative, not limiting. It will be further understood by those skilled in the art that various changes in form and detail may be made without departing from full scope of the disclosure, including the appended claims and their equivalents. It will also be understood that any of the embodiment(s) described herein may be used in conjunction with any other embodiment(s) described herein.

No claim element is to be construed under the provisions of 35 U.S.C. § 112, sixth paragraph, unless the element is expressly recited using the phrase "means for" or "means."

What is claimed is:

1. A wearable device, comprising:

communication circuitry;

at least one display;

memory, comprising one or more storage mediums, storing instructions; and at least one processor comprising processing circuitry;

wherein the instructions, when executed by the at least one processor, individually and/or collectively, cause the wearable device to:

while a first avatar of a user of the wearable device is within a virtual space, receive, via the communication circuitry, from a server, position information of a second avatar of another user, wherein the position information is transmitted from the server to the wearable device based on the second avatar entering the virtual space;

based on the second avatar being identified in accordance with the position information as positioned outside of a field of view (FoV) of the first avatar display, via the at least one display a user interface (UI) object indicating that the second avatar enters the virtual space as superimposed on a portion of the virtual space corresponding to the FoV of the first avatar; and based on the second avatar being identified in accordance with the position information as positioned inside of the FoV of the first avatar, refrain from displaying the UI object, and display, via the at least one display, at least a portion of the second avatar in the portion of the virtual space.

2. The wearable device of claim 1, wherein a display position of the UI object indicates a relative positional relationship between the FoV of the first avatar and a position of the second avatar at a timing at which the second avatar entering the virtual space.

3. The wearable device of claim 1, wherein the instructions, when executed by the at least one processor, individually and/or collectively, cause the wearable device to:

based on an input on the UI object, display, via the at least one display, another portion of the virtual space including the second avatar by adjusting the FoV of the first avatar.

4. The wearable device of claim 1, wherein the instructions, when executed by the at least one processor, individually and/or collectively, cause the wearable device to:

based on an input on the UI object, display, via the at least one display, another UI object indicating the portion of the virtual object as superimposed on the another portion of the virtual space.

5. The wearable device of claim 4, wherein the instructions, when executed by the at least one processor individually and/or collectively, cause the wearable device to:

based on an input on the another UI object, display, via the it least one display, the portion of the virtual space by adjusting the FoV of the first avatar.

6. The wearable device of claim 1, wherein the instructions, when executed by the at least one processor, individually and/or collectively, cause the wearable device to:

based on the second avatar being identified in accordance with the position information as positioned outside of the FoV of the first avatar, identify whether that the another user is registered with respect to a user account of the user of the wearable device;

based on the another user being identified as registered with respect to the user account, display, via the at least one display, the UI object as superimposed on the portion of the virtual space; and based on the another user being identified as not registered with respect to the user account, refrain from displaying the UI object.

7. The wearable device of claim 1, wherein the instructions, when executed by the at least one processor, individually and/or collectively, cause the wearable device to:

while the first avatar is the virtual space, receive, via the communication circuitry, from the server, another position information of a third avatar of a third user, wherein the another position information is transmitted from the server to the wearable device based on the third avatar entering the virtual space;

based on the third avatar being identified in accordance with the another position information as positioned outside of the FoV of the first avatar, display, via the at least one display, another UI object indicating that the third avatar enters the virtual space as superimposed on the portion of the virtual space; and based on the third avatar being identified in accordance with the another position information as positioned inside of the FoV of the first avatar, refrain from displaying the another UI object, and display, via the at least one display, at least a portion of the third avatar in the portion of the virtual space.

8. The wearable device of claim 7, wherein the instructions, when executed by the at least one processor, individually and/or collectively, cause the wearable device to:

based on the third avatar being identified in accordance with the another position information received after the position information is received as positioned outside of the FoV of the first avatar and positioned at a first position corresponding to a second position of the second avatar, display, via the at least one display, the another UI object as superimposed on at least a portion of the UI object.

9. The wearable device of claim 1, further comprising at least one sensor, wherein the instructions, when executed by the at least one processor, individually and/or collectively, cause the wearable device to:

identify, via the at least one sensor, a posture of the wearable device; and display, via the at least one display, the portion of the virtual space in accordance with the posture of the wearable device.

10. A method executed in a wearable device comprising communication circuitry and at least one display, the method comprising:

while a first avatar of a user of the wearable device is within a virtual space, receiving, via the communication circuitry, from a server, position information of a second avatar of another user, wherein the position information is transmitted from the server to the wearable device based on the second avatar entering the virtual space;

based on the second avatar being identified in accordance with the position information as positioned outside of a field of view (FoV) of the first avatar, displaying, via the at least one display, a user interface (UI) object indicating that the second avatar enters the virtual space as superimposed on a portion of the virtual space corresponding to the FoV of the first avatar; and based on the second avatar being identified in accordance with the position information as positioned inside of the FoV of the first avatar refraining from displaying the UI object, and display, via the at least one display, at least a portion of the second avatar in the portion of the virtual space.

11. The method of claim 10, wherein a display position of the UI object indicates a relative positional relationship between the FoV of the first avatar and a position of the second avatar at a timing at which the second avatar entering the virtual space.

12. The method of claim 11, further comprising:

based on an input on the UI object, displaying, via the at least one display, another portion of the virtual space including the second avatar by adjusting the FoV of the first avatar.

13. The method of claim 12, further comprising:

based on an input on the UI object, displaying, via the at least one display, another UI object indicating the portion of the virtual object as superimposed on the another portion of the virtual space.

14. The method of claim 13, further comprising:

based on an input on the another UI object, displaying, via the at least one display, the portion of the virtual space by adjusting the FoV of the first avatar.

15. The method of claim 10, further comprising:

based on the second avatar being identified in accordance with the position information as positioned outside of the FoV of the first avatar, identifying whether that the another user is registered with respect to a user account of the user of the wearable device;

based on the another user being identified as registered with respect to the user account, displaying, via the at least one display, the UI object as superimposed on the portion of the virtual space; and based on the another user being identified as not registered with respect to the user account, refraining from displaying the UI object.

16. The method of claim 10, further comprising:

while the first avatar is with the virtual space, receiving, via the communication circuitry, from the server, another position information of a third avatar of a third user, wherein the another position information is transmitted from the server to the wearable device based on the third avatar entering the virtual space;

based on the third avatar being identified in accordance with the another position information as positioned outside of the FoV of the first avatar, display, via the at least one displaying, another UI object indicating that the third avatar enters the virtual space as superimposed on the portion of the virtual space; and based on the third avatar being identified in accordance with the another position information as positioned inside of the FoV of the first avatar, refraining from displaying the another UI object, and display, via the at least one display, at least a portion of the third avatar in the portion of the virtual object.

17. The method of claim 16, further comprising:

based on the third avatar being identified in accordance with the another position information received after the position information is received as positioned outside of the FoV of the first avatar and positioned at a first position corresponding to a second position of the second avatar, displaying, via the at least one display, the another UI object as superimposed on at least a portion of the UI object.

18. The method of claim 10, wherein the wearable device further comprises at least one sensor, the method further comprising:

identifying, via the at least one sensor, a posture of the wearable device; and displaying, via the at least one display, the portion of the virtual space in accordance with the posture of the wearable device.

19. A non-transitory computer readable storage medium storing one or more programs, the one or more programs comprising instructions, when executed by a wearable device comprising communication circuitry and at least one display, cause the wearable device to:

while a first avatar of a user of the wearable device is within a virtual space, receive, via the communication circuitry, from a server, position information of a second avatar of another user, wherein the position information is transmitted from the server to the wearable device based on the second avatar entering the virtual space;

based on the second avatar being identified in accordance with the position information as positioned outside of a field of view (FoV) of the first avatar, display, via the at least one display, a user interface (UI) object indicating that the second avatar enters the virtual space as superimposed on a portion of the virtual space corresponding to the FoV of the first avatar, and based on the second avatar being identified in accordance with the position information as positioned inside of the FoV of the first avatar, refrain from displaying the UI object, and display, via the at least one display, at least a portion of the second avatar in the portion of the virtual space.

20. The non-transitory computer readable storage medium of claim 19, wherein a display position of the UI object indicates a relative positional relationship between the FoV of the first avatar and a position of the second a r at a timing at which the second avatar entering the virtual space.

* * * * *